United States Patent
Matsumura et al.

(10) Patent No.: US 12,225,471 B2
(45) Date of Patent: Feb. 11, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 470 days.

(21) Appl. No.: 17/617,813

(22) PCT Filed: Jun. 13, 2019

(86) PCT No.: PCT/JP2019/023585
§ 371 (c)(1),
(2) Date: Dec. 9, 2021

(87) PCT Pub. No.: WO2020/250402
PCT Pub. Date: Dec. 17, 2020

(65) Prior Publication Data
US 2022/0232482 A1  Jul. 21, 2022

(51) Int. Cl.
*H04W 52/14* (2009.01)
*H04W 52/24* (2009.01)
*H04W 72/23* (2023.01)
*H04W 74/0833* (2024.01)
*H04W 80/02* (2009.01)

(52) U.S. Cl.
CPC ....... *H04W 52/146* (2013.01); *H04W 52/242* (2013.01); *H04W 72/23* (2023.01); *H04W 74/0833* (2013.01); *H04W 80/02* (2013.01)

(58) Field of Classification Search
CPC . H04W 52/146; H04W 52/242; H04W 72/23; H04W 74/0833; H04L 5/0048
See application file for complete search history.

(56) References Cited

U.S. PATENT DOCUMENTS

| 2019/0281588 A1* | 9/2019 | Zhang | H04B 7/0617 |
| 2019/0349867 A1* | 11/2019 | MolavianJazi | H04W 52/40 |
| 2021/0105726 A1* | 4/2021 | Yao | H04W 52/242 |
| 2021/0392531 A1* | 12/2021 | Lu | H04W 52/146 |

OTHER PUBLICATIONS

International Search Report issued in PCT/JP2019/023585 on Jan. 7, 2020 (2 pages).
Written Opinion of the International Searching Authority issued in PCT/JP2019/023585 on Jan. 7, 2020 (6 pages).
(Continued)

*Primary Examiner* — Michael A Keller
*Assistant Examiner* — Chhian (Amy) Ling
(74) *Attorney, Agent, or Firm* — Osha Bergman Watanabe & Burton LLP

(57) ABSTRACT

A terminal according to one aspect of the present disclosure includes: a control section that determines a reference signal for pathloss reference for a physical uplink shared channel (PUSCH), based on any one of reception of a medium access control control element (MAC CE) and transmission of a random access channel; and a transmitting section that transmits the PUSCH by using transmission power based on the reference signal for pathloss reference. According to one aspect of the present disclosure, a parameter for transmission power control can be appropriately determined.

4 Claims, 13 Drawing Sheets

| SRI FIELD VALUE | POWER CONTROL CONFIGURATION |
|---|---|
| 0 | P0 #0, α #0, PATHLOSS REFERENCE RS #0, POWER CONTROL ADJUSTMENT STATE #0 |
| 1 | P0 #1, α #1, PATHLOSS REFERENCE RS #1, POWER CONTROL ADJUSTMENT STATE #1 |

(56) References Cited

OTHER PUBLICATIONS

Ericsson; "Signalling reduction for beam-based UL power control"; 3GPP TSG-RAN WG1 Meeting #97, Tdoc R1-1907475; Reno, USA; May 13-17, 2019 (5 pages).
Vivo; "Discussion on 2-step RACH procedure"; 3GPP TSG RAN WG1 #97, R1-1906125; Reno, USA; May 13-17, 2019 (9 pages).
LG Electronics; "Feature lead summary#3 of Enhancements on Multi-beam Operations "; 3GPP TSG RAN WG1 Meeting #97, R1-1907860; Reno, USA; May 13-17, 2019 (4 pages).
3GPP TS 38.213 V15.5.0; "3rd Generation Partnership Project; Technical Specification Group Radio Access Network; NR; Physical layer procedures for control (Release 15)"; Mar. 2019 (23 pages).
3GPP TS 38.321 V15.5.0; "3rd Generation Partnership Project; Technical Specification Group Radio Access Network; NR; Medium Access Control (MAC) protocol specification (Release 15)"; Mar. 2019 (3 pages).
3GPP TS 38.331 V15.5.1; "3rd Generation Partnership Project; Technical Specification Group Radio Access Network; NR; Radio Resource Control (RRC) protocol specification (Release 15)"; Apr. 2019 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

| SRI FIELD VALUE | POWER CONTROL CONFIGURATION |
|---|---|
| 0 | P0 #0, α #0, PATHLOSS REFERENCE RS #0, POWER CONTROL ADJUSTMENT STATE #0 |
| 1 | P0 #1, α #1, PATHLOSS REFERENCE RS #1, POWER CONTROL ADJUSTMENT STATE #1 |

FIG. 1

| ID | POWER CONTROL ADJUSTMENT STATE |
|---|---|
| #0 | POWER CONTROL ADJUSTMENT STATE #0 |
| #1 | POWER CONTROL ADJUSTMENT STATE #1 |
| #2 | POWER CONTROL ADJUSTMENT STATE #2 |
| #3 | POWER CONTROL ADJUSTMENT STATE #3 |

FIG. 6

| A-SRS RESOURCE ID | POWER CONTROL ADJUSTMENT STATE |
|---|---|
| #0 | POWER CONTROL ADJUSTMENT STATE #0 |
| #1 | POWER CONTROL ADJUSTMENT STATE #1 |
| #2 | POWER CONTROL ADJUSTMENT STATE #2 |
| #3 | POWER CONTROL ADJUSTMENT STATE #3 |

FIG. 7

| PATHLOSS REFERENCE RS ID | POWER CONTROL ADJUSTMENT STATE |
|---|---|
| #0 | POWER CONTROL ADJUSTMENT STATE #0 |
| #1 | POWER CONTROL ADJUSTMENT STATE #1 |
| #2 | POWER CONTROL ADJUSTMENT STATE #2 |
| #3 | POWER CONTROL ADJUSTMENT STATE #3 |

CASE WHERE A-SRS SPATIAL RELATION IS NOT UPDATED BY USING MAC CE

| SRI FIELD VALUE | POWER CONTROL CONFIGURATION |
|---|---|
| 0 | P0 #0, α #0, PATHLOSS REFERENCE RS #0, POWER CONTROL ADJUSTMENT STATE #0 (l = 0) |
| 1 | P0 #1, α #1, PATHLOSS REFERENCE RS #1, POWER CONTROL ADJUSTMENT STATE #1 (l = 1) |

FIG. 9B

CASE WHERE A-SRS SPATIAL RELATION IS UPDATED BY USING MAC CE

| SRI FIELD VALUE | POWER CONTROL CONFIGURATION |
|---|---|
| 00 | P0 #0, α #0, PATHLOSS REFERENCE RS #0, POWER CONTROL ADJUSTMENT STATE #0 (l = 0) |
| 01 | P0 #1, α #1, PATHLOSS REFERENCE RS #1, POWER CONTROL ADJUSTMENT STATE #1 (l = 1) |
| 10 | P0 #2, α #2, PATHLOSS REFERENCE RS #2, POWER CONTROL ADJUSTMENT STATE #2 (l = 2) |
| 11 | P0 #3, α #3, PATHLOSS REFERENCE RS #3, POWER CONTROL ADJUSTMENT STATE #3 (l = 3) |

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, LTE Rel. 8 to Rel. 14), a user terminal (UE (User Equipment)) controls transmission of an uplink shared channel (Physical Uplink Shared Channel (PUSCH)), based on downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a scheme in which a parameter for power control for uplink (UL) transmission of the PUCCH, the PUSCH, the SRS, or the like is indicated by using the downlink control information (DCI) or the like has been under study.

However, the number of candidates for the value of the parameter is limited. Unless the parameter is appropriately determined, deterioration of system performance may be caused, for example.

In the light of this, the present disclosure has an object to provide a terminal and a radio communication method for appropriately determining a parameter for transmission power control.

Solution to Problem

A terminal according to one aspect of the present disclosure includes: a control section that determines a reference signal for pathloss reference for a physical uplink shared channel (PUSCH), based on any one of reception of a medium access control control element (MAC CE) and transmission of a random access channel; and a transmitting section that transmits the PUSCH by using transmission power based on the reference signal for pathloss reference.

Advantageous Effects of Invention

According to one aspect of the present disclosure, the parameter for transmission power control can be appropriately determined.

BRIEF DESCRIPTION OF DRAWINGS

FIG. 1 is a diagram to show an example of association between an SRI field value and a power control configuration according to Rel. 15 NR;

FIG. 6 is a diagram to show an example of association between an ID and a power control adjustment state;

FIG. 7 is a diagram to show an example of association between an A-SRS resource ID and a power control adjustment state;

FIG. 8 is a diagram to show an example of association between a pathloss reference RS ID and a power control adjustment state;

FIG. 9A and FIG. 9B are each a diagram to show an example of association between an SRI field value and a power control configuration;

Figure 2:
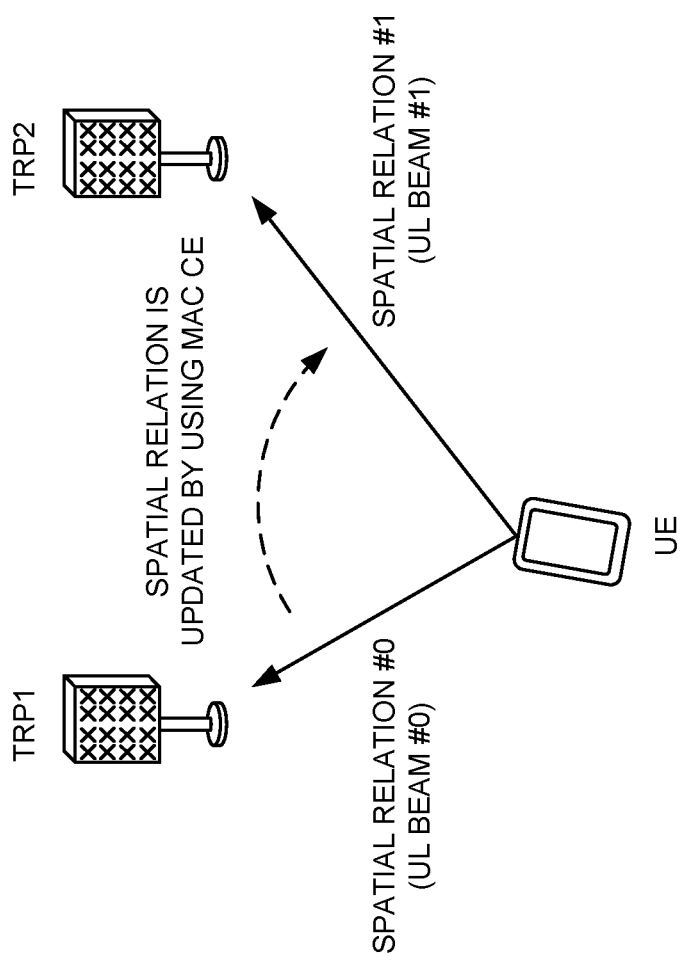
FIG. 2 is a diagram to show an example of update of spatial relation.

DESCRIPTION OF EMBODIMENTS (TCI, Spatial Relation, QCL)

In NR, control of reception processing (for example, at least one of reception, demapping, demodulation, and decoding) and transmission processing (for example, at least one of transmission, mapping, precoding, modulation, and coding) in a UE for at least one of a signal and a channel (referred to as a signal/channel) based on a transmission configuration indication state (TCI state) has been under study.

The TCI state may be a state applied to a downlink signal/channel. What is equivalent to the TCI state applied to an uplink signal/channel may be referred to as spatial relation.

The TCI state is information related to quasi-co-location (QCL) of a signal/channel, and may be referred to as a spatial reception parameter or the like. The TCI state may be configured for the UE for each channel or each signal.

Here, QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) are described below:

QCL type A: Doppler shift, Doppler spread, average delay, and delay spread;
QCL type B: Doppler shift and Doppler spread;
QCL type C: Doppler shift and average delay;
QCL type D: Spatial reception parameter.

A situation in which the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or QCL assumption of the signal/channel.

The TCI state may be, for example, information related to QCL between a channel being a target (or a reference signal (RS) for the channel) and another signal (for example, another downlink reference signal (DL-RS)). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), and a reference signal for measurement (Sounding Reference Signal (SRS)). Alternatively, the DL-RS may be a CSI-RS used for tracking (also referred to as a Tracking Reference Signal (TRS)) or a reference signal used for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element ("TCI-state IE" of the RRC) of the TCI state configured by higher layer signaling may include one or a plurality of pieces of QCL information ("QCL-Info"). The QCL information may include at least one of information related to the DL-RS to have a QCL relationship (DL-RS relation information) and information indicating the QCL type (QCL type information). The DL-RS relation information may include information of an index of the DL-RS (for example, an SSB index or a non-zero power CSI-RS (Non-Zero-Power (NZP) CSI-RS) resource ID (Identifier)), an index of a cell in which the RS is located, an index of a Bandwidth Part (BWP) in which the RS is located, and the like.

<TCI State for PDCCH>

Information related to the QCL between the PDCCH (or a demodulation reference signal (DMRS) antenna port related to the PDCCH) and a certain DL-RS may be referred to as a TCI state for the PDCCH or the like.

The UE may determine the TCI state for a UE-specific PDCCH (CORESET), based on higher layer signaling. For example, one or a plurality of (K) TCI states may be configured for the UE for each CORESET by using RRC signaling.

For the UE, for each CORESET, one of a plurality of TCI states configured by using RRC signaling may be activated by using the MAC CE. The MAC CE may be referred to as a TCI state indication MAC CE for UE-specific PDCCH (TCI State Indication for UE-specific PDCCH MAC CE). The UE may perform monitoring of the CORESET, based on an active TCI state corresponding to the CORESET.

<TCI State for PDSCH>

Information related to QCL between the PDSCH (or a DMRS antenna port related to the PDSCH) and a certain DL-RS may be referred to as a TCI state for the PDSCH or the like.

M (M≥1) TCI states for the PDSCH (M pieces of QCL information for the PDSCH) may be reported to (configured for) the UE by using higher layer signaling. Note that the number M of TCI states configured for the UE may be restricted by at least one of UE capability and the QCL type.

The DCI used for scheduling of the PDSCH may include a certain field indicating the TCI state for the PDSCH (which may be referred to as, for example, a TCI field, a TCI state field, or the like). The DCI may be used for scheduling of the PDSCH of one cell, and may be referred to as, for example, DL DCI, DL assignment, DCI format 1_0, DCI format 1_1, or the like.

Whether or not the TCI field is included in the DCI may be controlled by information reported from the base station to the UE. The information may be information indicating whether the TCI field is present or not (present or absent) in the DCI (for example, TCI presence information, in-DCI TCI presence information, or a higher layer parameter TCI-PresentInDCI). The information may be, for example, configured for the UE by using higher layer signaling.

When more than eight types of TCI states are configured for the UE, eight or less types of TCI states may be activated (or specified) by using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated by using the MAC CE.

For the CORESET for scheduling the PDSCH (CORESET used for PDCCH transmission for scheduling the PDSCH), when the TCI presence information set as "enabled" is configured for the UE, the UE may assume that the TCI field is present in DCI format 1_1 of the PDCCH transmitted on the CORESET.

For the CORESET for scheduling the PDSCH, when the TCI presence information is not configured or the PDSCH is scheduled by using DCI format 1_0, the UE may assume that the TCI state or the QCL assumption for the PDSCH is the same as the TCI state or the QCL assumption applied to the CORESET used for PDCCH transmission for scheduling the PDSCH for determining QCL of PDSCH antenna ports, if a time offset between reception of DL DCI (DCI for scheduling the PDSCH) and reception of the PDSCH corresponding to the DCI is equal to or greater than a threshold.

When the TCI presence information is set as "enabled", the UE may use the TCI according to the value of the TCI field in the detected PDCCH having the DCI for determining QCL of the PDSCH antenna ports, if the TCI field in the DCI in a component carrier (CC) for scheduling the (PDSCH) indicates the activated TCI state in the scheduled CC or DL BWP and the PDSCH is scheduled by using DCI format 1_1. When a time offset between reception of the DL DCI (for scheduling the PDSCH) and the PDSCH corresponding to the DCI (PDSCH scheduled by using the DCI) is equal to or greater than a threshold, the UE may assume that the DM-RS port of the PDSCH of a serving cell is quasi-co-located (QCL) with the RS in the TCI state related to a QCL type parameter given by the indicated TCI state.

When a single slot PDSCH is configured for the UE, the indicated TCI state may be based on the activated TCI state in the slot having the scheduled PDSCH. When a plurality of slot PDSCHs are configured for the UE, the indicated TCI state may be based on the activated TCI state in the first slot having the scheduled PDSCH, and the UE may expect that the TCI state is the same over the slots having the scheduled PDSCH. When the CORESET associated with the search space set for cross carrier scheduling is configured for the UE, the UE may assume that a time offset between the detected PDCCH and the PDSCH corresponding to the PDCCH is equal to or greater than a threshold, if, for the CORESET, the TCI presence information is set as "enabled" and at least one of the TCI states configured for the serving cell scheduled in the search space set has QCL type D.

When a time offset between reception of the DL DCI (DCI for scheduling the PDSCH) and a corresponding PDSCH (PDSCH scheduled by using the DCI) is less than a threshold in both of a case in which TCI information in the DCI (higher layer parameterTCI-PresentInDCI) is set as "enabled" in an RRC connection mode and a case in which the TCI information in the DCI is not configured, the UE may assume that the DM-RS port of the PDSCH of the serving cell is quasi-co-located (QCL) with the RS related to a QCL parameter used for QCL indication of the PDCCH of the CORESET that has the minimum (lowest) CORESET-ID in the latest (most recent) slot in which one or more CORESETs in the active BWP of the serving cell are monitored by the UE and that is associated with the monitored search space.

A time offset between reception of the DL DCI and reception of the PDSCH corresponding to the DCI may be referred to as scheduling offset.

The above-mentioned threshold may be referred to as "Threshold", "Threshold for offset between a DCI indicating a TCI state and a PDSCH scheduled by the DCI", "Threshold-Sched-Offset", "timeDurationForQCL", a schedule offset threshold, a scheduling offset threshold, a time length for QCL, or the like.

The scheduling offset threshold may be based on UE capability, or may be based on a delay caused in decoding of the PDCCH and beam switch, for example. Information of the scheduling offset threshold may be configured from the base station by using higher layer signaling, or may be transmitted from the UE to the base station.

For example, the UE may assume that the DMRS port of the PDSCH is quasi-co-located (QCL) with the DL-RS based on TCI state activated for the CORESET corresponding to the minimum CORESET-ID. The latest slot may be, for example, a slot in which the DCI for scheduling the PDSCH is received.

Note that the CORESET-ID may be an ID configured by using an RRC information element "ControlResourceSet" (ID for identification of the CORESET).

<Spatial Relation for PUCCH>

For the UE, a parameter (PUCCH configuration information, PUCCH-Config) used for PUCCH transmission may be configured by using higher layer signaling (for example, Radio Resource Control (RRC) signaling). The PUCCH configuration information may be configured for each partial band (for example, an uplink bandwidth part (Bandwidth-part (BWP))) in a carrier (also referred to as a cell, a component carrier, or the like).

The PUCCH configuration information may include a list of pieces of PUCCH resource set information (for example, PUCCH-ResourceSet) and a list of pieces of PUCCH spatial relation information (for example, PUCCH-SpatialRelation-Info).

The PUCCH resource set information may include a list (for example, resourceList) of PUCCH resource indexes (IDs, for example, PUCCH-ResourceId).

When the UE does not have dedicated PUCCH resource configuration information (for example, dedicated PUCCH resource configuration) that is provided by the PUCCH resource set information in the PUCCH configuration information (before RRC setup), the UE may determine the PUCCH resource set, based on a parameter (for example, pucch-ResourceCommon) in system information (for example, System Information Block Type1 (SIB 1) or Remaining Minimum System Information (RMSI)). The PUCCH resource set may include 16 PUCCH resources.

In contrast, when the UE has the dedicated PUCCH resource configuration information (uplink control channel configuration dedicated to the UE, dedicated PUCCH resource configuration) (after RRC setup), the UE may determine the PUCCH resource set according to the number of UCI information bits.

The UE may determine one PUCCH resource (index) in the PUCCH resource set (for example, the PUCCH resource set determined to be specific to a cell or dedicated to the UE), based on at least one of the value of a certain field (for example, a PUCCH resource indication (PUCCH resource indicator) field) in the downlink control information (DCI) (for example, DCI format 1_0 or 1_1 used for scheduling of the PDSCH), the number ($N_{CCE}$) of CCEs in the control resource set (CORESET) for PDCCH reception for carrying the DCI, and the index ($n_{CCE,0}$) of the first CCE of the PDCCH reception.

The PUCCH spatial relation information (for example, "PUCCH-spatialRelationInfo" of an RRC information element) may indicate a plurality of candidate beams (spatial domain filters) for PUCCH transmission. The PUCCH spatial relation information may indicate spatial relation between the RS (Reference signal) and the PUCCH.

The list of pieces of PUCCH spatial relation information may include some elements (PUCCH spatial relation information IEs (Information Elements)). Each piece of PUCCH spatial relation information may include, for example, at least one of the index of the PUCCH spatial relation information (ID, for example, pucch-SpatialRelationInfoId), the index of the serving cell (ID, for example, servingCellId), and information related to the RS (reference RS) having spatial relation with the PUCCH.

For example, the information related to the RS may be an SSB index, a CSI-RS index (for example, an NZP-CSI-RS resource configuration ID), or an SRS resource ID and an ID of the BWP. The SSB index, the CSI-RS index, and the SRS resource ID may be associated with at least one of a beam, a resource, and a port selected by measurement of a corresponding RS.

For the UE, one of one or more pieces of PUCCH spatial relation information (for example, PUCCH-SpatialRelation-Info or a candidate beam) in the list of pieces of PUCCH spatial relation information may be indicated by using the MAC (Medium Access Control) CE (Control Element). The MAC CE may be a MAC CE for activating or deactivating the PUCCH spatial relation information (PUCCH spatial relation information activation/deactivation MAC CE, PUCCH spatial relation information indication MAC CE).

The UE may activate the PUCCH relation information specified by the MAC CE after the elapse of 3 ms since transmission of a positive response (ACK) to the MAC CE for activating a certain piece of PUCCH spatial relation information.

The UE may control transmission of the PUCCH, based on the PUCCH spatial relation information activated by using the MAC CE. Note that, when a single piece of PUCCH spatial relation information is included in the list of pieces of PUCCH spatial relation information, the UE may control transmission of the PUCCH, based on the PUCCH spatial relation information.

<Spatial Relation for SRS and PUSCH>

The UE may receive information (SRS configuration information, for example, a parameter in "SRS-Config" of an RRC control element) that is used for transmission of a reference signal for measurement (for example, a sounding reference signal (SRS)).

Specifically, the UE may receive at least one of information related to one or a plurality of SRS resource sets (SRS resource set information, for example, "SRS-ResourceSet" of an RRC control element) and information related to one or a plurality of SRS resources (SRS resource information, for example, "SRS-Resource" of an RRC control element).

One SRS resource set may be related to a certain number of SRS resources (the certain number of SRS resources may be grouped together). Each SRS resource may be identified with an SRS resource identifier (SRS Resource Indicator (SRI)) or an SRS resource ID (Identifier).

The SRS resource set information may include an SRS resource set ID (SRS-ResourceSetId), a list of SRS resource IDs used in the resource set (SRS-ResourceId), an SRS resource type (for example, any one of a periodic SRS, a semi-persistent SRS, and an aperiodic CSI (Aperiodic SRS)), and information of usage of the SRS.

Here, the SRS resource type may indicate any one of the periodic SRS (P-SRS), the semi-persistent SRS (SP-SRS), and the aperiodic CSI (Aperiodic SRS (A-SRS)). Note that the UE may transmit the P-SRS and the SP-SRS periodically (or after activation, periodically), and may transmit the A-SRS based on an SRS request of the DCI.

The usage ("usage" of an RRC parameter, "SRS-SetUse" of an L1 (Layer-1) parameter) may be, for example, beam management (beamManagement), a codebook (CB), a non-codebook (NCB), antenna switching, or the like. The SRS used for the codebook or the noncodebook may be used for determination of a precoder of PUSCH transmission of codebook base or noncodebook base that is based on the SRI.

For example, in a case of codebook base transmission, the UE may determine the precoder for PUSCH transmission, based on the SRI, a transmitted rank indicator (TRI), and a transmitted precoding matrix indicator (TPMI). In a case of noncodebook base transmission, the UE may determine the precoder for PUSCH transmission, based on the SRI.

The SRS resource information may include an SRS resource ID (SRS-ResourceId), the number of SRS ports, an SRS port number, transmission Comb, SRS resource mapping (for example, a time and/or frequency resource position, a resource offset, a period of the resource, the number of repetition, the number of SRS symbols, an SRS bandwidth, or the like), hopping relation information, an SRS resource type, a sequence ID, spatial relation information of the SRS, and the like.

The spatial relation information of the SRS (for example, "spatialRelationInfo" of an RRC information element) may indicate spatial relation information between a certain reference signal and the SRS. The certain reference signal may be at least one of a synchronization signal/broadcast channel (Synchronization Signal/Physical Broadcast Channel (SS/PBCH)) block, a channel state information reference signal (CSI-RS), and an SRS (for example, another SRS). The SS/PBCH block may be referred to as a synchronization signal block (SSB).

The spatial relation information of the SRS may include at least one of an SSB index, a CSI-RS resource ID, and an SRS resource ID, as the index of the certain reference signal.

Note that, in the present disclosure, the SSB index, the SSB resource ID, and the SSBRI (SSB Resource Indicator) may be interchangeably interpreted as each other. The CSI-RS index, the CSI-RS resource ID, and the CRI (CSI-RS Resource Indicator) may be interchangeably interpreted as each other. The SRS index, the SRS resource ID, and the SRI may be interchangeably interpreted as each other.

The spatial relation information of the SRS may include a serving cell index, a BWP index (BWP ID), or the like corresponding to the certain reference signal.

In NR, transmission of the uplink signal may be controlled based on whether or not there is beam correspondence (BC). The BC may be, for example, capability of a certain node (for example, the base station or the UE) to determine a beam (transmit beam, Tx beam) used for transmission of the signal, based on a beam (receive beam, Rx beam) used for reception of the signal.

Note that the BC may be referred to as transmit/receive beam correspondence (Tx/Rx beam correspondence), beam reciprocity, beam calibration, calibrated/non-calibrated, reciprocity calibrated/non-calibrated, a correspondence degree, a matching degree, or the like.

For example, in a case without the BC, the UE may transmit the uplink signal (for example, the PUSCH, the PUCCH, the SRS, or the like) by using a beam (spatial domain transmission filter) that is the same as that for the SRS(s) (or the SRS resource(s)) indicated from the base station, based on a measurement result of such one or more SRSs (or SRS resources).

In contrast, in a case with the BC, the UE may transmit the uplink signal (for example, the PUSCH, the PUCCH, the SRS, or the like) by using a beam (spatial domain transmission filter) that is the same as or that is equivalent to a beam (spatial domain reception filter) used for reception of a certain SSB or CSI-RS (or CSI-RS resource).

Regarding a certain SRS resource, when the spatial relation information related to the SSB or the CSI-RS and the SRS is configured for the UE (for example, in a case with the BC), the UE may transmit the SRS resource by using a spatial domain filter (spatial domain transmission filter) that is the same as a spatial domain filter (spatial domain reception filter) for reception of the SSB or the CSI-RS. In this case, the UE may assume that a UE receive beam for the SSB or the CSI-RS and a UE transmit beam for the SRS are the same.

Regarding a certain SRS (target SRS) resource, when the spatial relation information related to another SRS (reference SRS) and the SRS (target SRS) are configured for the UE (for example, in a case without the BC), the UE may transmit the target SRS resource by using a spatial domain filter (spatial domain transmission filter) that is the same as a spatial domain filter (spatial domain transmission filter) for transmission of the reference SRS. In other words, in this case, the UE may assume that the UE transmit beam for the reference SRS and the UE transmit beam for the target SRS are the same.

The UE may determine spatial relation of the PUSCH scheduled by using the DCI, based on the value of a certain field (for example, an SRS resource identifier (SRI) field) in the DCI (for example, DCI format 0_1). Specifically, the UE may use, for PUSCH transmission, the spatial relation information (for example, "spatialRelationInfo" of an RRC information element) of the SRS resource determined based on the value (for example, the SRI) of the certain field.

(Multiple TRPs)

In NR, a scheme in which one or a plurality of transmission/reception points (TRPs) (multiple TRPs) perform DL transmission to a UE by using one or a plurality of panels (multiple panels) has been under study. A scheme in which the UE performs UL transmission to one or a plurality of TRPs has been under study.

Note that the plurality of TRPs may correspond to the same cell identifier (ID), or may correspond to different cell IDs. The cell ID may be a physical cell ID, or may be a virtual cell ID.

From each TRP of the multiple TRPs, a different code word (CW) and a different layer may be transmitted. As one form of the multi-TRP transmission, non-coherent joint transmission (NCJT) has been under study.

In NCJT, for example, TRP 1 performs modulation mapping of the first code word and performs layer mapping so as to transmit the first PDSCH by using first precoding for a first number of layers (for example, two layers). TRP 2 performs modulation mapping of the second code word and performs layer mapping so as to transmit the second PDSCH by using second precoding for a second number of layers (for example, two layers). These first PDSCH and second PDSCH may be assumed as not being in a relationship of quasi-co-location (QCL) (not quasi-co-located).

Note that it may be defined that the plurality of PDSCHs subjected to NCJT partially or entirely overlap regarding at least one of the time and frequency domains. In other words, at least one of time and frequency resources of the first PDSCH from the first TRP and the second PDSCH from the second TRP may overlap.

(Pathloss Reference RS)

A pathloss reference RS (a pathloss reference reference signal (RS), an RS for pathloss reference, an RS for pathloss measurement) is used for calculation of pathloss for the PUSCH/PUCCH/SRS. In Rel. 15 NR, the maximum number of pathloss reference RSs is 4. In other words, the UE does not expect to simultaneously hold more than four pathloss reference RSs per serving cell for all of the PUSCH/PUCCH/SRS transmission.

(Transmission Power Control)

<Transmission Power Control for PUSCH>

In NR, transmission power of the PUSCH is controlled based on a TPC command (also referred to as a value, an increased/decreased value, a correction value, or the like) indicated by the value of a certain field (also referred to as a TPC command field or the like) in the DCI.

For example, when the UE transmits the PUSCH in an active UL BWP b of an active UL BWP b of a carrier f of a serving cell c by using a parameter set (open loop parameter set) having an index j and an index l of a power control adjustment state, transmission power ($P_{PUSCH, b,f,c}(i, j, q_d, l)$) of the PUSCH in a PUSCH transmission occasion (also referred to as transmission period or the like) i may be expressed as in Equation (1) shown below.

Here, as the power control adjustment state, whether there are a plurality of states (for example, two states) or there is a single state may be configured by using a higher layer parameter. When a plurality of power control adjustment states are configured, one of the plurality of power control adjustment states may be identified with the index l (for example, $l \in \{0, 1\}$). The power control adjustment state may be referred to as a PUSCH power control adjustment state, a first or second state, or the like.

The PUSCH transmission occasion i is a certain period in which the PUSCH is transmitted, and may include one or more symbols, one or more slots, or the like, for example.

[Math. 1]

$$P_{PUSCH,b,f,c}(i, j, q_d, l) = \min \left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\}$$

Equation (1)

In Equation (1), $P_{CMAX,f,c}(i)$ is, for example, transmission power (also referred to as maximum transmission power, UE maximum output power, or the like) of the user terminal that is configured for the carrier f of the serving cell c in the transmission occasion i. $P_{O\_PUSCH,b,f,c}(j)$ is, for example, a parameter (for example, also referred to as a parameter related to a transmission power offset, a transmission power offset P0, a target received power parameter, or the like) related to target received power that is configured for the active UL BWP b of the carrier f of the serving cell c in the transmission occasion i.

$M^{PUSCH}_{RB,b,f,c}(i)$ is, for example, the number of resource blocks (bandwidth) that is assigned to the PUSCH for the transmission occasion i in the active UL BWP b of the carrier f of the serving cell c and a subcarrier spacing μ. $α_{b,f,c}(j)$ is a value that is provided by a higher layer parameter (for example, also referred to as msg3-Alpha, p0-PUSCH-Alpha, a fractional factor, or the like).

$PL_{b,f,c}(q_d)$ is, for example, pathloss (pathloss compensation) that is calculated in the user terminal by using an index $q_d$ of a reference signal (the pathloss reference RS, the DL RS for pathloss measurement, PUSCH-PathlossReferenceRS) for the downlink BWP associated with the active UL BWP b of the carrier f of the serving cell c.

$Δ_{TF,b,f,c}(i)$ is a transmission power adjustment component (offset, transmission format compensation) for the UL BWP b of the carrier f of the serving cell c.

$f_{b,f,c}(i, l)$ is a value (for example, the power control adjustment state, an accumulated value of the TPC command, or a value by a closed loop) that is based on the TPC command of the power control adjustment state index l of the active UL BWP of the carrier f of the serving cell c and the transmission occasion i. For example, $f_{b,f,c}(i, l)$ may be expressed as in Equation (2). l may be referred to as a closed loop index.

[Math. 2]

$$f_{b,f,c}(i, l) = f_{b,f,c}(i_{last}+l) + δ_{PUSCH,b,f,c}(i_{last}+i, K_{PUSCH}, l) \quad \text{Equation (2)}$$

In Equation (2), for example, $δ_{PUSCH,b,f,c}(i_{last}, i, K_{PUSCH}, l)$ may be the TPC command indicated by the TPC command field value in the DCI (for example, DCI format 0_0 or 0_1) that is detected in the active UL BWP b of the carrier f of the serving cell c for the transmission occasion i after the immediately preceding transmission occasion hast of the PUSCH, or may be the TPC command indicated by the TPC command field value in the DCI (for example, DCI format 2_2) that has CRC parity bits scrambled with a specific RNTI (Radio Network Temporary Identifier) (for example, a TPC-PUSCH-RNTI) (that is subjected to CRC scrambling).

When the UE is not provided with the pathloss reference RS (for example, PUSCH-PathlossReferenceRS) or when the UE is not provided with a dedicated higher layer parameter, the UE may calculate $PL_{b,f,c}(q_d)$ by using the RS resource from the SSB used for obtaining the Master Information Block (MIB).

When up to as many as RS resource indexes as the value of the maximum number (for example, maxNrofPUSCH-PathlossReferenceRS) of the pathloss reference RS and a set of RS configurations for respective RS resource indexes with the pathloss reference RS are configured for the UE, the set of RS resource indexes may include one or both of a set of SS/PBCH block indexes and a set of CSI-RS resource indexes. The UE may identify the RS resource index $q_d$ in the set of RS resource indexes.

When PUSCH transmission is scheduled by using a Random Access Response (RAR) UL grant, the UE may use the RS resource index $q_d$ that is the same as that for corresponding PRACH transmission.

When the UE is provided with configuration (for example, SRI-PUSCH-PowerControl) of power control of the PUSCH by the SRI and is provided with one or more values of the IDs of the pathloss reference RSs, mapping between the set of the values for the SRI field in DCI format 0_1 and the set of ID values of the pathloss reference RSs may be obtained from higher layer signaling (for example, sri-PUSCH-PowerControl-Id in SRI-PUSCH-PowerControl). The UE may determine the RS resource index $q_d$, based on the ID of the pathloss reference RS mapped to the SRI field value in DCI format 0_1 for scheduling the PUSCH.

When PUSCH transmission is scheduled by using DCI format 0_0 and the UE is not provided with the PUCCH spatial relation information for the PUCCH resource having the lowest index for the active UL BWP b of each carrier f and the serving cell c, the UE may use the RS resource index $q_d$ that is the same as that for PUCCH transmission in the PUCCH resource.

When PUSCH transmission is scheduled by using DCI format 0_0 and the UE is not provided with spatial setting of PUCCH transmission, when PUSCH transmission is scheduled by using DCI format 0_1 not including the SRI field, or when configuration of power control of the PUSCH by the SRI is not provided for the UE, the UE may use the RS resource index $q_d$ having the ID of the pathloss reference RS of zero.

When configured grant configuration includes a certain parameter (for example, rrc-CofiguredUplinkGrant) for PUSCH transmission that is configured with configured grant configuration (for example, ConfiguredGrantConfig), the RS resource index $q_d$ may be provided for the UE by using a pathloss reference index (for example, pathlossReferenceIndex) in the certain parameter.

When the configured grant configuration does not include a certain parameter for PUSCH transmission that is configured with configured grant configuration, the UE may determine the RS resource index $q_d$, based on the value of the ID of the pathloss reference RS mapped to the SRI field in the DCI format for activating PUSCH transmission. When the DCI format does not include the SRI field, the UE may determine the RS resource index $q_d$ having the ID of the pathloss reference RS of zero.

Note that Equations (1) and (2) are merely examples, and these are not restrictive. It is only necessary that the user terminal control transmission power of the PUSCH, based on at least one of the parameters shown in Equations (1) and (2). An additional parameter may be included, or a part of the parameters may be omitted. In Equations (1) and (2) shown above, transmission power of the PUSCH is controlled for each active UL BWP of a certain carrier of a certain serving cell, but this is not restrictive. At least a part of the serving cell, the carrier, the BWP, and the power control adjustment state may be omitted.

<Transmission Power Control for PUCCH>

In NR, transmission power of the PUCCH is controlled based on the TPC command (also referred to as a value, an increased/decreased value, a correction value, an indication value, or the like) that is indicated by the value of a certain field (also referred to as a TPC command field, a first field, or the like) in the DCI.

For example, with the use of the index l of the power control adjustment state, transmission power ($P_{PUCCH,b,f,c}(i, q_u, q_d, l)$) of the PUCCH in the PUCCH transmission occasion (also referred to as a transmission period or the like) i regarding the active UL BWP b of the carrier f of the serving cell c may be expressed as in Equation (3) shown below.

The power control adjustment state may be referred to as a PUCCH power control adjustment state, a first or second state, or the like.

The PUCCH transmission occasion i is a certain period in which the PUCCH is transmitted, and may include one or more symbols, one or more slots, or the like, for example.

[Math. 3]

$$P_{PUCCH,b,f,c}(i, q_u, q_d, l) = \min\left\{\begin{array}{l}P_{CMAX,f,c}(i),\\ P_{O,PUCCH,b,f,c}(q_u) + 10\log_{10}(2^\mu \cdot M^{PUCCH}_{RB,b,f,c}(i)) + PL_{b,f,c}(q_d) + \Delta_{F,PUCCH}(F) + \Delta_{TF,b,f,c}(i) + g_{b,f,c}(i, l)\end{array}\right\}$$

Equation (3)

In Equation (3), $P_{CMAX,f,c(i)}$ is, for example, transmission power (also referred to as maximum transmission power, UE maximum output power, or the like) of the user terminal that is configured for the carrier f of the serving cell c in the transmission occasion i. $P_{O\_PUCCH,b,f,c}(q_u)$ is, for example, a parameter (for example, also referred to as a parameter related to a transmission power offset, a transmission power offset P0, a target received power parameter, or the like) related to target received power that is configured for the active UL BWP b of the carrier f of the serving cell c in the transmission occasion i.

$M^{PUCCH}_{RB,b,f,c}(i)$ for example, the number of resource blocks (bandwidth) that is assigned to the PUCCH for the transmission occasion i in the active UL BWP b of the carrier f of the serving cell c and a subcarrier spacing μ. $PL_{b,f,c}(q_d)$ is, for example, pathloss that is calculated in the user terminal by using an index $q_d$ of a reference signal (the pathloss reference RS, the DL RS for pathloss measurement, PUCCH-PathlossReferenceRS) for the downlink BWP associated with the active UL BWP b of the carrier f of the serving cell c.

$\Delta_{F\_PUCCH}(F)$ is a higher layer parameter that is given for each PUCCH format. $\Delta_{TF,b,f,c}(i)$ is a transmission power adjustment component (offset) for the UL BWP b of the carrier f of the serving cell c.

$g_{b,f,c}(i, l)$ is a value (for example, the power control adjustment state, an accumulated value of the TPC command, a value by a closed loop, or a PUCCH power adjustment state) that is based on the TPC command of the power control adjustment state index l of the active UL BWP of the carrier f of the serving cell c and the transmission occasion i. For example, $g_{b,f,c}(i, l)$ may be expressed as in Equation (4).

[Math. 4]

$$g_{b,f,c}(i, l) = g_{b,f,c}(i_{last}, l) + \delta_{PUSCH,b,f,c}(i_{last} + i, K_{PUSCH}, l)$$

Equation (4)

In Equation (4), for example, $\delta_{PUCCH,b,f,c}(i_{last}, i, K_{PUCCH}, l)$ may be the TPC command indicated by the TPC command field value in the DCI (for example, DCI format 1_0 or 1_1) that is detected in the active UL BWP b of the carrier f of the serving cell c for the transmission occasion i after the immediately preceding transmission occasion $i_{last}$ of the PUCCH, or may be the TPC command indicated by the TPC command field value in the DCI (for example, DCI format 2_2) that has CRC parity bits scrambled with a specific Radio Network Temporary Identifier (RNTI) (for example, a TPC-PUCCH-RNTI) (that is subjected to CRC scrambling).

If the UE is provided with information (twoPUCCH-PC-AdjustmentStates) indicating that two PUCCH power control adjustment states are used and the PUCCH spatial relation information (PUCCH-SpatialRelationInfo), l may be {0, 1}, and if the UE is not provided with information indicating that two power control adjustment states for the PUCCH are used or the spatial relation information for the PUCCH, l may be 0.

If the UE obtains a TPC command value from DCI format 1_0 or 1_1 and the UE is provided with the PUCCH spatial relation information, the UE may obtain mapping between the PUCCH spatial relation information ID (pucch-SpatialRelationInfoId) value and the closed loop index (closedLoopIndex, power adjustment state index l) with an index provided by a P0 ID for the PUCCH (p0-PUCCH-Id in p0-Set in PUCCH-PowerControl in PUCCH-Config). When the UE receives an activation command including the value of the PUCCH spatial relation information ID, the UE may determine the value of the closed loop index that provides the value of l through a link to a corresponding P0 ID for the PUCCH.

If the UE is provided with configuration of the $P_{O\_PUCCH,b,f,c}(q_u)$ value for a corresponding PUCCH power adjustment state l regarding the active UL BWP b of the carrier f of the serving cell c from a higher layer, $g_{b,f,c}(i, l)=0$ and k=0, 1, . . . , i. If the UE is provided with the PUCCH spatial relation information, the UE may determine the value of l from the value of $q_u$, based on the PUCCH spatial relation information associated with the P0 ID for the PUCCH corresponding to $q_u$ and the closed loop index value corresponding to l.

$q_u$ may be the P0 ID for the PUCCH (p0-PUCCH-Id) that indicates P0 for the PUCCH (P0-PUCCH) in a P0 set in the PUCCH (p0-Set).

Note that Equations (3) and (4) are merely examples, and these are not restrictive. It is only necessary that the user terminal control transmission power of the PUCCH, based on at least one of the parameters shown in Equations (3) and (4). An additional parameter may be included, or a part of the parameters may be omitted. In Equations (3) and (4) shown above, transmission power of the PUCCH is controlled for each active UL BWP of a certain carrier of a certain serving cell, but this is not restrictive. At least a part of the serving cell, the carrier, the BWP, and the power control adjustment state may be omitted.

<Transmission Power Control for SRS>

For example, with the use of the index l of the power control adjustment state, transmission power ($P_{SRS,b,f,c}(i, q_s, l)$) of the SRS in the SRS transmission occasion (also referred to as a transmission period or the like) i regarding the active UL BWP b of the carrier f of the serving cell c may be expressed as in Equation (5) shown below.

The power control adjustment state may be referred to as an SRS power control adjustment state (SRS power control adjustment state), a value based on the TPC command, an accumulated value of the TPC command, a value by the closed loop, a first or second state, or the like. l may be referred to as a closed loop index.

The SRS transmission occasion i is a certain period in which the SRS is transmitted, and may include one or more symbols, one or more slots, or the like, for example.

[Math. 5]

$$P_{SRS,b,f,c}(i, q_s, l) = \min\left\{\begin{array}{l}P_{CMAX,f,c}(i),\\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l)\end{array}\right\} \quad \text{Equation (5)}$$

In Equation (5), $P_{CMAX,f,c}(i)$ is, for example, UE maximum output power for the carrier f of the serving cell c in the SRS transmission occasion i. $P_{O\_SRS,b,f,c}(q_s)$ is a parameter (for example, also referred to as a parameter related to a transmission power offset, a transmission power offset P0, a target received power parameter, or the like) related to target received power that is provided by p0 for the active UL BWP b of the carrier f of the serving cell c and an SRS resource set $q_s$ (provided by SRS-ResourceSet and SRS-ResourceSetId).

$M_{SRS,b,f,c}(i)$ is an SRS bandwidth that is represented by the number of resource blocks for the SRS transmission occasion i in the active UL BWP b of the carrier f of the serving cell c and the subcarrier spacing $\mu$.

$\alpha_{SRS,b,f,c}(q_s)$ is provided by $\alpha$ (for example, alpha) for the active UL BWP b of the carrier f of the serving cell c and the subcarrier spacing $\mu$ and the SRS resource set $q_s$.

$PL_{b,f,c}(q_d)$ is a DL pathloss estimation value [dB] that is calculated by the UE by using the RS resource index $q_d$ for the active DL BWP of the serving cell c and the SRS resource set $q_s$. The RS resource index $q_d$ is a pathloss reference RS (a DL RS for pathloss measurement, which is, for example, provided by pathlossReferenceRS) that is associated with the SRS resource set $q_s$, and is an SS/PBCH block index (for example, ssb-Index) or a CSI-RS resource index (for example, csi-RS-Index).

$h_{b,f,c}(i, l)$ is an SRS power control adjustment state for the active UL BWP of the carrier f of the serving cell c and the SRS transmission occasion i. When configuration of the SRS power control adjustment state (for example, srs-PowerControlAdjustmentStates) indicates the same power control adjustment state as SRS transmission and PUSCH transmission, $h_{b,f,c}(i, l)$ is the current PUSCH power control adjustment state $f_{b,f,c}(i, l)$. In contrast, when the configuration of the SRS power control adjustment state indicates a power control adjustment state independently of SRS transmission and PUSCH transmission and configuration of TPC accumulation is not provided, the SRS power control adjustment state $h_{b,f,c}(i)$ may be expressed as in Equation (6).

[Math. 6]

$$h_{b,f,c}(i) = h_{b,f,c}(i-1) + \sum_{m=0}^{C(S_i)-1} \delta_{SRS,b,f,c}(m) \quad \text{Equation (6)}$$

In Equation (6), $\delta_{SRS,b,f,c}(m)$ is coded with other TPC commands in the PDCCH including the DCI (for example, DCI format 2_3). $\Sigma\delta_{SRS,b,f,c}(m)$ is a sum of the TPC commands in a set $S_i$ of the TPC command values having cardinality c ($S_i$) that is received by the UE between $K_{SRS}$ (i-$i_0$)−1 symbols before an SRS transmission occasion i-$i_0$ and $K_{SRS}$ (i) symbols before the SRS transmission occasion i in the active UL BWP b of the carrier f of the serving cell c and the subcarrier spacing $\mu$. Here, $i_0$>0 is a minimum integer whereby the $K_{SRS}$ (i-$i_0$)−1 symbols before the SRS transmission occasion i-$i_0$ are earlier than the $K_{SRS}$ (i) symbols before the SRS transmission occasion i.

Note that Equations (5) and (6) are merely examples, and these are not restrictive. It is only necessary that the user terminal control transmission power of the SRS, based on at least one of the parameters shown in Equations (5) and (6). An additional parameter may be included, or a part of the parameters may be omitted. In Equations (5) and (6) shown above, transmission power of the SRS is controlled for each BWP of a certain carrier of a certain cell, but this is not restrictive. At least a part of the cell, the carrier, the BWP, and the power control adjustment state may be omitted.

(Indication of Power Control Configuration)

In Rel. 15 NR, to follow a change of spatial relation, switch between a plurality of states of an open loop (OL)-TPC or a closed loop (CL)-TPC is enabled by the SRI field in the DCI. When the usage of the SRS resource set is codebook transmission (codebook), the maximum number of SRI field values is 2 (the SRI field length is 1 bit), and when the usage of the SRS resource set is noncodebook transmission (nonCodebook), the maximum number of SRI field values is 4 (the SRI field length is 2 bits).

To configure the power control configuration for the PUSCH, a list (sri-PUSCH-MappingToAddModList) of power control configurations (SRI-PUSCH-PowerControl) mapped to the SRI field values is included in the PUSCH power control information (PUSCH-PowerControl) in the PUSCH configuration information (PUSCH-Config). The power control configuration includes a power control configuration ID corresponding to the SRI field value (sri-PUSCH-PowerControlId), a pathloss reference RS ID indicating the pathloss reference RS (sri-PUSCH-PathlossReferenceRS-Id), a P0-α set ID indicating a set of P0 and α (sri-P0-PUSCH-AlphaSetId), and a closed loop (CL) ID corresponding to the power control state l (sri-PUSCH-ClosedLoopIndex).

At least one of the pathloss reference RS ID, the P0-α set ID, and the closed loop ID may be referred to as a power control (transmission power control, TPC) parameter. At least one of the pathloss reference RS ID and the P0-α set ID is used for open loop (OL) power control, and may be hence referred to as an OL power control (TPC) parameter. The closed loop ID is used for closed loop (CL) power control, and may be hence referred to as a CL power control (TPC) parameter.

For example, as shown in FIG. 1, power control configuration #0 including P0 #0, α #0, pathloss reference RS #0, and power control adjustment state #0 (l=0) may be associated with SRI field value 0, and power control configuration #1 including P0 #1, α #1, pathloss reference RS #1, and power control adjustment state #1 (l=1) may be associated with SRI field value 1. The associated power control configuration is indicated for the UE by using the SRI field.

When only one SRS resource is configured for the UE, the SRI field length is 0 bits.

To configure the power control configuration for the PUCCH, the power control configuration (PUCCH-PowerControl) is included in the PUCCH configuration information (PUCCH-Config). The power control configuration includes a correction value $\Delta_{F\_PUCCH}(F)$ for each PUCCH format (deltaF-PUCCH-f0, deltaF-PUCCH-f1, deltaF-PUCCH-f2, deltaF-PUCCH-f3, deltaF-PUCCH-f4), a set of P0 (p0-Set), a set of pathloss reference RSs (pathlossReferenceRSs), and information indicating whether or not two PUCCH power adjustment states are used (twoPUCCH-PCAdjustmentStates). The pathloss reference RS may be represented by the SSB index (SSB-Index) or the CSI-RS (NZP-CSI-RS resource ID (NZP-CSI-RS-ResourceId)).

In this manner, in Rel. 15 NR, the power control configuration can be switched.

At the same time, a scheme in which spatial relation (UL transmit beam) of the A-SRS is updated by using the MAC CE has been under study. For example, as shown in FIG. 2, the UL transmit beam is updated from UL transmit beam #0 to TRP 1 to UL transmit beam #1 to TRP 2 by using the MAC CE.

When the spatial relation is updated, it is preferable that the transmission power be updated as well. Not only when the UL transmit beam for a plurality of TRPs is changed but when the UL transmit beam for a single TRP is changed as well, a path (pathloss) is changed.

However, in Rel. 15 NR, the number of power control configurations that can be switched by using the SRI field or RRC signaling is limited. For example, as described above, the number of power control configurations that can be switched by using the SRI field is 2 or 4.

At the same time, when the UL transmit beam is managed by using the SRS or when the UL transmit beam is managed by using the DL RS (the SSB or the CSI-RS) by means of beam correspondence, it is conceivable that the number of UL transmit beams exceeds the number of power control configurations that can be switched by using the SRI field. Unless the power control configuration is appropriately updated when the spatial relation is updated, UL transmission is not appropriately performed, with the result that performance of a system may be deteriorated.

In the light of this, the inventors of the present invention came up with the idea of a method of updating a parameter related to power control.

An embodiment according to the present disclosure will be described in detail below with reference to the drawings. A radio communication method according to each embodiment may be individually applied, or may be applied in combination.

In the present disclosure, the spatial relation may be interpreted as spatial relation information, spatial relation assumption, a spatial domain transmission filter, a UE spatial domain transmission filter, a spatial domain filter, a UE transmit beam, a UL transmit beam, a DL-RS, QCL assumption, an SRI, spatial relation based on an SRI, or the like.

The TCI state may be interpreted as a TCI state or QCL assumption, QCL assumption, a spatial domain reception filter, a UE spatial domain reception filter, a spatial domain filter, a UE receive beam, a DL receive beam, a DL-RS, or the like. The RS of QCL type D, the DL-RS associated with QCL type D, the DL-RS having QCL type D, a source of the DL-RS, the SSB, and the CSI-RS, may be interpreted as each other.

In the present disclosure, the TCI state may be information (for example, the DL-RS, the QCL type, the cell in which the DL-RS is transmitted, or the like) related to a receive beam (spatial domain reception filter) that is indicated (configured) for the UE. The QCL assumption may be information (for example, the DL-RS, the QCL type, the cell in which the DL-RS is transmitted, or the like) related to a receive beam (spatial domain reception filter) that is assumed by the UE, based on transmission or reception of an associated signal (for example, the PRACH).

In the present disclosure, "A/B" may be interpreted as "A or B", "A and B", or "at least one of A and B". In the present disclosure, a PCell, a primary secondary cell (PSCell), and a special cell (SpCell) may be interchangeably interpreted as each other.

In the present disclosure, a TRP, a panel, a TRP ID, a panel ID, a CORESET group ID for a CORESET of the PDCCH from the TRP or the panel, a CORESET ID indicating a CORESET of the PDCCH from the TRP or the panel, and another index (a DMRS port group ID or the like) corresponding to the TRP or the panel may be interchangeably interpreted as each other.

In the present disclosure, the SRS may be interpreted as at least one of the A-SRS, the P-SRS, and the SP-SRS.

In the present disclosure, the pathloss reference RS, the pathloss reference RS for the PUSCH, the pathloss reference RS for the PUCCH, and the pathloss reference RS for the SRS, may be interchangeably interpreted as each other.

(Radio Communication Method)

First Embodiment

The pathloss reference RS may be updated (activated) by the MAC CE.

For the UE, more than four pathloss reference RSs may be configured. The RSs simultaneously used by the UE for calculation of pathloss may be referred to as active pathloss reference RSs.

For the UE, the number (maximum number) of active pathloss reference RSs may be configured (restricted) by the number of active pathloss reference RSs configured as a new RRC parameter.

For the UE, the number (maximum number) of active pathloss reference RSs may be configured (restricted) by the RRC parameter of Rel. 15 (for example, the maximum number of pathloss reference RSs for the PUSCH (maxNrofPUSCH-PathlossReferenceRSs) or the maximum number of pathloss reference RSs for the PUCCH (maxNrofPUCCH-PathlossReferenceRSs)). In other words, the UE may interpret the RRC parameter of Rel. 15 as the number (maximum number) of active pathloss reference RSs.

The UE may report the number of active pathloss reference RSs as UE capability information. For the UE, as many active pathloss reference RSs as the reported number of active pathloss reference RSs may be configured or activated.

The UE may receive the MAC CE for activation/deactivation (activation MAC CE) of the pathloss reference RS.

AS the activation MAC CE of the pathloss reference RS, at least one of the following, MAC CE 1 for the PUSCH, MAC CE 1 for the PUCCH, MAC CE 2 for the PUSCH, and MAC CE 2 for the PUCCH, may be used.

<<MAC CE 1 for PUSCH>>

Figure 3:
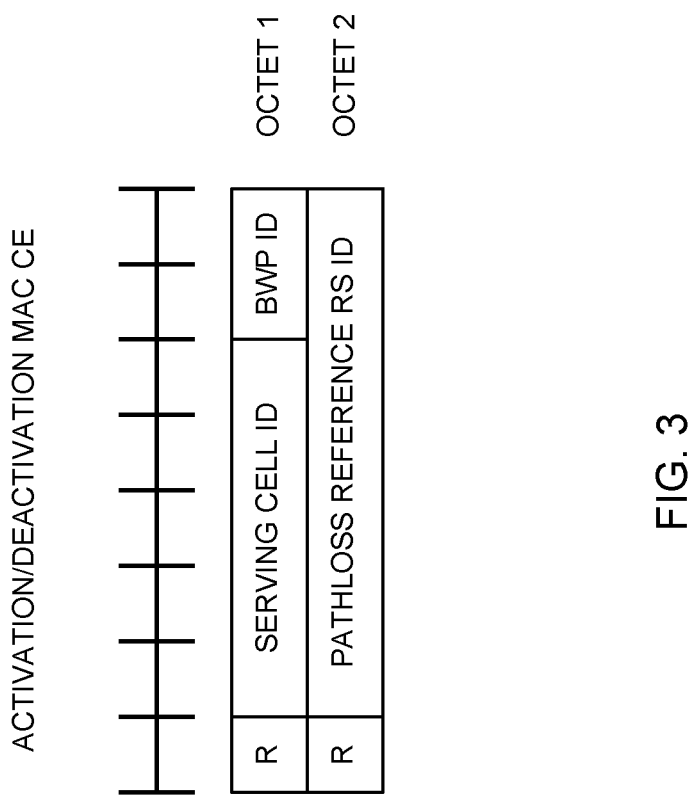
FIG. 3 is a diagram to show an example of an activation MAC CE of a pathloss reference RS.

As shown in FIG. 3, the activation MAC CE of the pathloss reference RS for the PUSCH may include a field of at least one of a serving cell ID, a BWP ID, a pathloss reference RS ID, and reserved bits.

The serving cell ID field may indicate an identifier of the serving cell to which the MAC CE is applied. The length of the field may be 5 bits.

The BWP ID field may indicate the UL BWP to which the MAC CE is applied as a code point of a BWP indicator field in the DCI. The length of the field may be 2 bits.

The pathloss reference RS ID field may include an identifier of one active pathloss reference RS that is identified with the pathloss reference RS ID for the PUSCH (for example, PUSCH-PathlossReferenceRS-Id). The length of the field may be x bits.

The reserved bit (R) field may be set to 0.

One MAC CE may activate one pathloss reference RS for the PUSCH.

The UE may use the active pathloss reference RS for measurement of the pathloss for the PUSCH.

One MAC CE for each SRI field value may activate one pathloss reference RS for the PUSCH. The UE may associate the active pathloss reference RS with a corresponding SRI field value (power control configuration). The UE may use the pathloss reference RS associated with the received SRI field value out of a plurality of active pathloss reference RSs associated with a plurality of SRI field values for measurement of the pathloss.

For example, the power control configuration as shown in FIG. 1 may be configured for the UE, the pathloss reference RS that is activated by using the MAC CE corresponding to SRI field value 0 may be used as pathloss reference RS #0, and the pathloss reference RS that is activated by using the MAC CE corresponding to SRI field value 1 may be used as pathloss reference RS #1. When the UE receives the SRI field, the UE may use the pathloss reference RS corresponding to the SRI field value out of pathloss reference RSs #0 and #1 for measurement of the pathloss for the PUSCH.

<<MAC CE 1 for PUCCH>>

Similarly to FIG. 3, the activation MAC CE of the pathloss reference RS for the PUCCH may include a field of at least one of a serving cell ID, a BWP ID, a pathloss reference RS ID, and reserved bits.

The serving cell ID field may indicate an identifier of the serving cell to which the MAC CE is applied. The length of the field may be 5 bits.

The BWP ID field may indicate the UL BWP to which the MAC CE is applied as a code point of a BWP indicator field in the DCI. The length of the field may be 2 bits.

The pathloss reference RS ID field may include an identifier of one active pathloss reference RS that is identified with the pathloss reference RS ID for the PUCCH (PUCCH-PathlossReferenceRS-Id). The length of the field may be x bits.

The reserved bit (R) field may be set to 0.

One MAC CE may activate one pathloss reference RS for the PUCCH.

The UE may use the active pathloss reference RS for measurement of the pathloss.

One MAC CE for each SRI field value may activate one pathloss reference RS for the PUCCH. The UE may associate the active pathloss reference RS with a corresponding SRI field value (power control configuration). The UE may use the pathloss reference RS associated with the received SRI field value out of a plurality of active pathloss reference RSs associated with a plurality of SRI field values for measurement of the pathloss for the PUCCH.

For example, the power control configuration as shown in FIG. 1 may be configured for the UE, the pathloss reference RS that is activated by using the MAC CE corresponding to SRI field value 0 may be used as pathloss reference RS #0, and the pathloss reference RS that is activated by using the MAC CE corresponding to SRI field value 1 may be used as pathloss reference RS #1. When the UE receives the SRI field, the UE may use the pathloss reference RS corresponding to the SRI field value out of pathloss reference RSs #0 and #1 for measurement of the pathloss for the PUCCH.

<<MAC CE 2 for PUSCH>>

Figure 4:
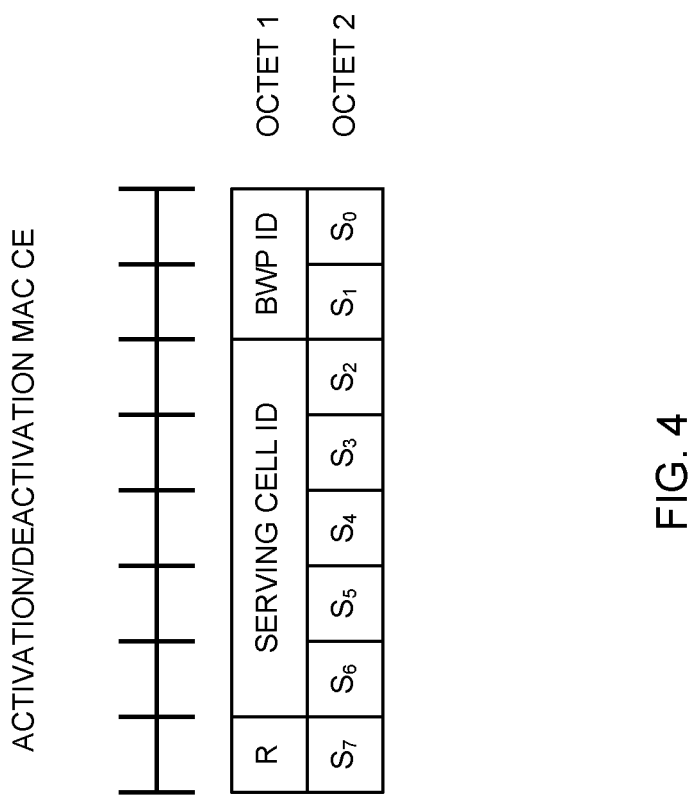
FIG. 4 is a diagram to show another example of the activation MAC CE of the pathloss reference RS.

As shown in FIG. 4, the activation MAC CE of the pathloss reference RS for the PUSCH may include a field of at least one of a serving cell ID, a BWP ID, $S_i$, and reserved bits.

The serving cell ID field may indicate an identifier of the serving cell to which the MAC CE is applied. The length of the field may be 5 bits.

The BWP ID field may indicate the UL BWP to which the MAC CE is applied as a code point of a BWP indicator field in the DCI. The length of the field may be 2 bits.

The reserved bit (R) field may be set to 0.

When there is a pathloss reference RS including the pathloss reference RS ID (PUSCH-PathlossReferenceRS-Id) i for the PUSCH configured for the UL BWP indicated by the BWP ID field, the $S_i$ field may indicate an activation state of the pathloss reference RS including the pathloss reference RS ID i for the PUSCH, or otherwise, the MAC entity may ignore the field. The $S_i$ field is set to 1 in order to indicate that the pathloss reference RS including the pathloss reference RS ID i for the PUSCH is to be activated. The $S_i$ field is set to 0 in order to indicate that the pathloss reference RS including the pathloss reference RS ID i for the PUSCH is to be deactivated.

The number of the $S_i$ fields may be defined in a specification, or may be the number of active pathloss reference RSs that is configured by using RRC signaling.

For one PUSCH, up to one pathloss reference RS may be activated at one time.

The UE may use the active pathloss reference RS for measurement of the pathloss for the PUSCH.

One MAC CE for each SRI field value may activate one pathloss reference RS for the PUSCH. The UE may associate the active pathloss reference RS with a corresponding SRI field value (power control configuration). The UE may use the pathloss reference RS associated with the received SRI field value out of a plurality of active pathloss reference RSs associated with a plurality of SRI field values for measurement of the pathloss.

For one PUSCH, up to N pathloss reference RSs may be active at one time. One MAC CE may activate a plurality of pathloss reference RSs for the PUSCH.

The N active pathloss reference RSs may be respectively associated with N power control configurations (SRI-PUSCH-PowerControl). The k-th power control configuration corresponding to an SRI field value k ($0 \leq k \leq N-1$) may be associated with the k-th active pathloss reference RS.

For example, the power control configuration as shown in FIG. 1 may be configured for the UE, the first pathloss reference RS that is activated by using the MAC CE may be used as active pathloss reference RS #0, and the second pathloss reference RS that is activated by using the MAC CE may be used as active pathloss reference RS #1. In addition, eight pathloss reference RSs #0 to #7 for the PUSCH may be configured for the UE by using RRC signaling, and two pathloss reference RSs #1 and #5 out of the eight pathloss reference RSs may be indicated as active pathloss reference RSs #0 and #1 by the MAC CE. In this case, active pathloss reference RS #0 may correspond to pathloss reference RS #1, active pathloss reference RS #1 may correspond to pathloss reference RS #1, and active pathloss reference RS #1 may correspond to pathloss reference RS #5. For the UE, one power control configuration may be indicated by the SRI field in the DCI. For example, when SRI field value #1 is indicated, active pathloss reference RS #1 in power control configuration #1 may use pathloss reference RS #5 for measurement of the pathloss for the PUSCH.

<<MAC CE 2 for PUCCH>>

Similarly to FIG. 4, the activation MAC CE of the pathloss reference RS for the PUCCH may include a field of at least one of a serving cell ID, a BWP ID, $S_i$, and reserved bits.

The serving cell ID field may indicate an identifier of the serving cell to which the MAC CE is applied. The length of the field may be 5 bits.

The BWP ID field may indicate the UL BWP to which the MAC CE is applied as a code point of a BWP indicator field in the DCI. The length of the field may be 2 bits.

The reserved bit (R) field may be set to 0.

When there is a pathloss reference RS including the pathloss reference RS ID (PUCCH-PathlossReferenceRS-Id) i for the PUCCH configured for the UL BWP indicated by the BWP ID field, the $S_i$ field may indicate an activation state of the pathloss reference RS including the pathloss reference RS ID i for the PUCCH, or otherwise, the MAC entity may ignore the field. The $S_i$ field is set to 1 in order to indicate that the pathloss reference RS including the pathloss reference RS ID i for the PUCCH is to be activated. The $S_i$ field is set to 0 in order to indicate that the pathloss reference RS including the pathloss reference RS ID i for the PUCCH is to be deactivated.

The number of the $S_i$ fields may be defined in a specification, or may be the number of active pathloss reference RSs that is configured by using RRC signaling.

For one PUCCH resource, up to one pathloss reference RS may be activated at one time.

The UE may use the active pathloss reference RS for measurement of the pathloss for the PUCCH.

One MAC CE for each SRI field value may activate one pathloss reference RS for the PUCCH. The UE may associate the active pathloss reference RS with a corresponding SRI field value (power control configuration). The UE may use the pathloss reference RS associated with the received SRI field value out of a plurality of active pathloss reference RSs associated with a plurality of SRI field values for measurement of the pathloss for the PUCCH.

For one PUCCH, up to N pathloss reference RSs may be active at one time. One MAC CE may activate a plurality of pathloss reference RSs for the PUCCH.

The N active pathloss reference RSs may be respectively associated with N power control configurations (PUCCH-PowerControl). The k-th power control configuration corresponding to an SRI field value k (0≤k≤N−1) may be associated with the k-th active pathloss reference RS.

For example, the power control configuration as shown in FIG. 1 may be configured for the UE, the first pathloss reference RS that is activated by using the MAC CE may be used as active pathloss reference RS #0, and the second pathloss reference RS that is activated by using the MAC CE may be used as active pathloss reference RS #1. In addition, eight pathloss reference RSs #0 to #7 for the PUCCH may be configured for the UE by using RRC signaling, and two pathloss reference RSs #1 and #5 out of the eight pathloss reference RSs may be indicated as active pathloss reference RSs #0 and #1 by the MAC CE. In this case, active pathloss reference RS #0 may correspond to pathloss reference RS #1, active pathloss reference RS #1 may correspond to pathloss reference RS #1, and active pathloss reference RS #1 may correspond to pathloss reference RS #5. For the UE, one power control configuration may be indicated by the SRI field in the DCI. For example, when SRI field value #1 is indicated, active pathloss reference RS #1 in power control configuration #1 may use pathloss reference RS #5 for measurement of the pathloss for the PUCCH.

According to the embodiment, the number of candidates for the pathloss reference RS can be increased in comparison to Rel. 15 NR. For example, the number of candidates for the pathloss reference RS can be made to match the number of candidates for spatial relation (for example, the number of SSBs or the like).

The following embodiments may be applied to a power control parameter of at least one of the PUSCH and the PUCCH.

Second Embodiment

When specific information for a specific signal of at least one of the spatial relation, the TCI state, and the QCL assumption is updated or activated in a specific procedure, the pathloss reference RS for a specific UL channel may be updated to a specific RS (automatic update of the pathloss reference RS). In other words, when specific information for a specific signal of at least one of the spatial relation, the TCI state, and the QCL assumption is indicated or activated in a specific procedure, the UE may determine the specific RS as the pathloss reference RS for a specific UL channel.

The UE may report whether or not the UE supports the automatic update of the pathloss reference RS for at least one of the PUSCH, the PUCCH, and the SRS as a part of the UE capability information. Only when the UE reports that the UE supports the automatic update of the pathloss reference RS for at least one of the PUSCH, the PUCCH, and the SRS, the automatic update of the pathloss reference RS may be configured.

When at least one condition of the following RS update conditions 1 to 6 is satisfied and specific information for a specific signal is updated or activated in a specific procedure, the pathloss reference RS for a specific UL channel may be updated to a specific RS.

<<RS Update Condition 1>>

As the spatial relation of a specific UL channel, the DL RS or the UL RS is configured. The condition may be a condition that the RS configured in the spatial relation of the SRS is the DL RS. The DL RS may be the SSB or the CSI-RS. The UL RS may be the SRS. The SRS may be at least one of the A-SRS, the P-SRS, and the SP-SRS.

By using the DL RS as the pathloss reference RS, the UE can appropriately measure the pathloss of the DL.

<<RS Update Condition 2>>

The condition may be a condition that the SRS resource is configured or indicated as the spatial relation of at least one of the PUSCH and the PUCCH. For the UE, the spatial relation of the PUSCH may be indicated by the SRI field.

The condition may be a condition that the SRS resource is configured or indicated as the spatial relation of at least one of the PUSCH and the PUCCH, and the spatial relation of the SRS resource is updated by using the MAC CE.

<<RS Update Condition 3>>

The condition may be a condition that the SRS resource configured or indicated for the spatial relation of at least one of the PUSCH and the PUCCH is updated by using the MAC CE. For the UE, the spatial relation may be indicated by the SRI field. The condition may be a condition that the SRS resource in the SRS resource set having the usage of codebook transmission (codebook) or noncodebook transmission (nonCodebook) configured for the PUSCH is updated by using the MAC CE.

<<RS Update Condition 4>>

The condition may be a condition that the spatial relation currently used for at least one of the PUSCH, the PUCCH, and the SRS is updated or activated by using the MAC CE.

For the UE, the spatial relation may be indicated by the SRI field. The condition may be a condition that the spatial relation used for the last transmission of at least one of the PUSCH, the PUCCH, and the SRS is updated by using the MAC CE.

<<RS Update Condition 5>>

The condition may be a condition that the pathloss reference RS for at least one of the PUSCH, the PUCCH, and the SRS is updated or activated by using the MAC CE. The MAC CE may be any one of MAC CEs 1 to 4 according to the first embodiment.

<<RS Update Condition 6>>

The condition may be a condition that the automatic update of the pathloss reference RS for at least one of the PUSCH, the PUCCH, and the SRS is configured for the UE. The condition may be a condition that the UE reports that the UE supports the automatic update of the pathloss reference RS.

<<RS Update Condition 7>>

The condition may be a condition that the pathloss reference RS for at least one of the PUSCH, the PUCCH, and the SRS is not configured for the UE.

The pathloss reference RS may be updated according to at least one of the following RS update methods 1 to 3.

<<RS Update Method 1>>

The specific signal may be an SRS of at least one of the A-SRS, the P-SRS, and the SP-SRS. The specific information may be the spatial relation of the SRS. The specific procedure may be the MAC CE. The specific UL channel may be at least one of the PUSCH and the PUCCH. The specific RS may be the SSB or the CSI-RS that is configured as the DL RS of the active SRS resource.

In other words, when the spatial relation of the SRS is updated or activated by using the MAC CE, the pathloss reference RS for at least one of the PUSCH and the PUCCH may be updated to the DL RS of the active SRS resource.

Figure 5:
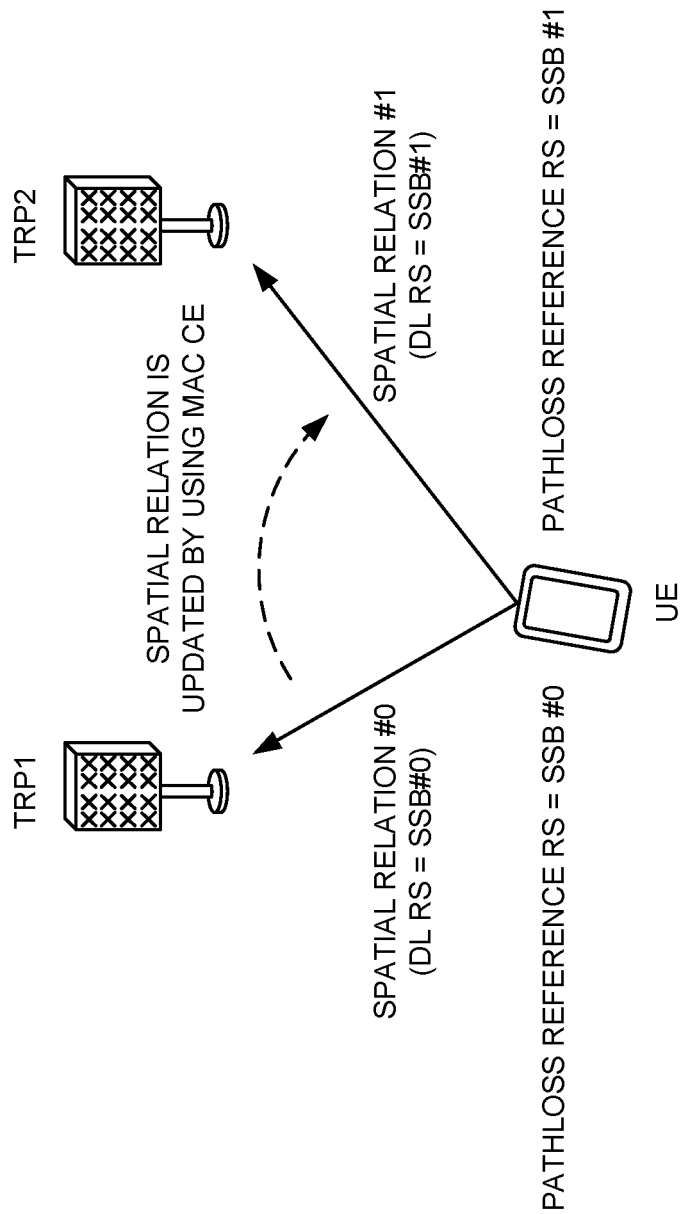
FIG. 5 is a diagram to show an example of update of the pathloss reference RS along with update of spatial relation.

In the example of FIG. 5, the UE uses spatial relation #0 as the spatial relation of the A-SRS. The DL RS of spatial relation #0 is SSB #0 that is transmitted from TRP #1. The UE uses SSB #0 as the pathloss reference RS.

It is assumed that the spatial relation of the A-SRS is updated from spatial relation #0 to spatial relation #1 by using the MAC-CE. The DL RS of spatial relation #1 is SSB #1 that is transmitted from TRP 2. As the pathloss reference RS, the UE uses SSB #1 that is the same as the updated spatial relation.

When at least one condition of RS update conditions 1 to 7 described above is satisfied and the spatial relation of the SRS is updated or activated by using the MAC CE, the pathloss reference RS for at least one of the PUSCH, the PUCCH, and the SRS may be updated to the DL RS of the active SRS resource.

By causing the pathloss reference RS for UL transmission to follow the spatial relation of the UL transmission, transmission power control of the UL transmission can be appropriately performed.

<<RS Update Method 2>>

The specific signal may be at least one of the PDCCH and the PDSCH. The specific information may be the TCI state for at least one of the PDCCH and the PDSCH. The specific procedure may be the MAC CE. The specific UL channel may be at least one of the PUSCH and the PUCCH.

The specific RS may be the DL RS of the TCI state. If the updated TCI state includes a plurality of DL RSs, the specific RS may be the RS of QCL type D out of the plurality of DL RSs. The specific RS may be the RS (default TCI state) related to a QCL parameter used for QCL indication of the PDCCH of the CORESET that has the lowest CORESET-ID in the latest slot in which one or more CORESETs in the active BWP of the serving cell are monitored by the UE and that is associated with the monitored search space.

In other words, when the TCI state of at least one of the PDCCH and the PDSCH is updated or activated by using the MAC CE, the pathloss reference RS for at least one of the PUSCH and the PUCCH may be updated to the DL RS of the TCI state (RS of QCL type D).

When at least one condition of RS update conditions 1 to 7 described above is satisfied and the TCI state for at least one of the PDCCH and the PDSCH is updated or activated by using the MAC CE, the pathloss reference RS for at least one of the PUSCH and the PUCCH may be updated to the DL RS of the TCI state (RS of QCL type D).

For example, when the pathloss reference RS for at least one of the PUSCH, the PUCCH, and the SRS is not configured for the UE (RS update condition 7) and the TCI state for at least one of the PDCCH and the PDSCH is updated or activated by using the MAC CE, the pathloss reference RS for at least one of the PUSCH and the PUCCH may be updated to the DL RS of the TCI state (RS of QCL type D, default TCI state).

By causing the pathloss reference RS for UL transmission and the spatial relation for UL transmission to follow the TCI state, beam management can be appropriately performed.

<<RS Update Method 3>>

The specific signal may be the PDCCH. The specific information may be QCL assumption for the PDCCH. The specific procedure may be PRACH transmission, or may be PRACH transmission in beam failure recovery (BFR). The specific UL channel may be at least one of the PUSCH and the PUCCH. The specific RS may be the SSB that corresponds to a PRACH transmission occasion (PRACH resource).

In other words, when the QCL assumption of the PDCCH is updated by using PRACH transmission, the pathloss reference RS for at least one of the PUSCH and the PUCCH may be updated to the SSB corresponding to the PRACH transmission occasion.

For the UE, the TCI state may not be explicitly indicated. For example, the PRACH transmission occasion may be associated with the SSB. When the UE transmits the PRACH, the SSB corresponding to the PRACH transmission occasion may be determined as the QCL assumption of CORESET 0.

When at least one condition of RS update conditions 1 to 7 described above is satisfied and the QCL assumption of the PDCCH is updated by using PRACH transmission, the pathloss reference RS for at least one of the PUSCH and the PUCCH may be updated to the SSB corresponding to the PRACH transmission occasion.

According to the present embodiment, the pathloss reference RS can be updated according to update of at least one of the spatial relation, the TCI state, and the QCL assumption, and appropriate transmission power can thus be determined.

Third Embodiment

When a plurality of sets each including at least one of P0 and $\alpha$ are configured for the UE regarding at least one of the PUSCH, the PUCCH, and the SRS, at least one of the sets may be updated or activated by using the MAC CE. The set may be interpreted as a P0-α set (for example, p0-Alpha-Sets, P0-PUSCH-AlphaSet), a P0 set (for example, p0-Set), or the like.

The P0-α set may be updated or activated by using at least one of the following set update methods 1 to 3.

<<Set Update Method 1>>

The P0-α set may be updated independently of the pathloss reference RS. The P0-α set may be updated by using one MAC CE that is different from the MAC CE for update of the pathloss reference RS. The MAC CE for update of the P0-α set may have a configuration in which the pathloss reference RS ID is replaced with a P0-α set ID in the configuration of the MAC CE according to the first embodiment.

One MAC CE may activate one P0-α set.

The UE may use an active P0-α set for transmission power control.

One MAC CE for each SRI field value may activate one P0-α set. The UE may associate the active P0-α set with a corresponding SRI field value (power control configuration).

The UE may use the P0-α set that is associated with the receive SRI field value out of a plurality of active P0-α sets that are associated with a plurality of SRI field values for measurement of the pathloss.

For example, the power control configuration as shown in FIG. 1 may be configured for the UE, the P0-α set that is activated by the MAC CE corresponding to SRI field value 0 may be used as P0-α set #0, and the P0-α set that is activated by the MAC CE corresponding to SRI field value 1 may be used as P0-α set #1. When the UE receives the SRI field, the UE may use the P0-α set corresponding to the SRI field value out of P0-α sets #0 and #1 for transmission power control.

Up to N P0-α sets may be active at one time. One MAC CE may activate a plurality of P0-α sets.

The N P0-α sets may be respectively associated with N power control configurations. The k-th power control configuration corresponding to an SRI field value k (0≤k≤N−1) may be associated with the k-th P0-α set.

<<Set Update Method 2>>

The P0-α set need not be explicitly updated by using one MAC CE. The UE may update the P0-α set according to update of the spatial relation or the pathloss reference RS.

For the UE, the P0-α set mapped to the spatial relation for the PUCCH or the SRS on a one-to-one basis may be configured. When the spatial relation is updated or activated by using the MAC CE, the P0-α set may be updated or activated to the P0-α set corresponding to the updated or activated spatial relation.

For the UE, the P0-α set mapped to the pathloss reference RS for the PUCCH, the SRS, or the PUSCH on a one-to-one basis may be configured. When the pathloss reference RS is updated or activated by using the MAC CE, the P0-α set may be updated or activated to the P0-α set corresponding to the updated or activated pathloss reference RS.

<<Set Update Method 3>>

The P0-α set may be updated together by using one MAC CE for update of the pathloss reference RS. A new field for an ID of the P0-α set may be added to the MAC CE according to the first embodiment. The MAC CE for update of the power control configuration including the pathloss reference RS and the P0-α set may have a configuration in which the pathloss reference RS ID is replaced with a power control configuration ID (for example, a power control ID or sri-PUSCH-PowerControlId) in the configuration of the MAC CE according to the first embodiment. The UE may use the P0-α set activated by using the MAC CE for transmission power control, or may use the P0-α set activated by using the MAC CE for power control configuration, in a manner similar to set update method 1.

According to the present embodiment, the P0-α set can be determined based on the MAC CE indicating at least one of the P0-α set, the spatial relation, and the pathloss reference RS, and appropriate transmission power can thus be determined.

Fourth Embodiment

The UE may determine the power control adjustment state, based on a specific indication. The specific indication may indicate at least one of the spatial relation, the power control adjustment state, and the pathloss reference RS. The power control adjustment state may be at least one of the PUSCH power control adjustment state $f_{b,f,c}(i, l)$, the PUCCH power control adjustment state $g_{b,f,c}(i, l)$, and the SRS power control adjustment state $h_{b,f,c}(i, l)$. A default state (default value of the accumulated value of the TPC command) may be zero.

The number of power control adjustment states that can be calculated or stored by the UE may depend on UE capability. The UE may report the number of power control adjustment states that can be calculated or stored by the UE as UE capability information. For the UE, up to as many power control adjustment states as the reported number may be configured.

When at least one condition of the following state update conditions 1 to 4 is satisfied, the UE may determine the power control adjustment state, based on a specific indication.

<<State Update Condition 1>>

The condition may be a condition that the spatial relation of the SRS resource is configured or indicated as the spatial relation of at least one of the PUSCH and the PUCCH. For the UE, the spatial relation may be indicated by the SRI field. The condition may be a condition that, as the spatial relation of at least one of the PUSCH and the PUCCH, the spatial relation of a plurality of SRS resources is configured, and one spatial relation of the plurality of SRS resources is indicated or activated by using the MAC CE.

<<State Update Condition 2>>

The condition may be a condition that the SRS resource configured or indicated for the spatial relation of at least one of the PUSCH and the PUCCH is updated by using the MAC CE. For the UE, the spatial relation may be indicated by the SRI field. The condition may be a condition that the SRS resource in the SRS resource set having the usage of codebook transmission (codebook) or noncodebook transmission (nonCodebook) configured for the PUSCH is updated by using the MAC CE.

<<State Update Condition 3>>

The condition may be a condition that the spatial relation currently used for at least one of the PUSCH, the PUCCH, and the SRS is updated by using the MAC CE. For the UE, the spatial relation may be indicated by the SRI field. The condition may be a condition that the spatial relation used for the last transmission of at least one of the PUSCH and the PUCCH is updated by using the MAC CE.

<<State Update Condition 4>>

The condition may be a condition that the pathloss reference RS for at least one of the PUSCH, the PUCCH, and the SRS is updated by using the MAC CE.

The UE may determine the power control adjustment state according to at least one of the following state update methods 1 to 4.

<<State Update Method 1>>

If the spatial relation of the SRS is updated by using the MAC CE, the UE may reset the power control adjustment state to a default state. The SRS may be at least one of the A-SRS, the P-SRS, and the SP-SRS.

<<State Update Method 2>>

The UE may calculate or store a plurality of power control adjustment states corresponding to a plurality of IDs (indexes), one of the plurality of IDs may be indicated by the MAC CE, and the UE may apply an active power control adjustment state to at least one of the PUSCH and the PUCCH.

For example, as shown in FIG. 6, when four IDs are configured for the UE by using RRC signaling and the UE receives the MAC CE indicating activation of ID #1, the UE may apply the power control adjustment state of power control adjustment state ID #1 to closed loop transmission power control (CL-TPC).

When at least one condition of state update conditions 1 to 4 described above is satisfied and one of the plurality of IDs is activated by the MAC CE, the UE may apply the active power control adjustment state to at least one of the PUSCH and the PUCCH.

The UE need not be required to calculate or store a deactive power control adjustment state (accumulate the TPC command). In other words, the UE may calculate or store only an active power control adjustment state.

The UE may calculate or store the active power control adjustment state and the deactive power control adjustment state.

One MAC CE may activate one power control adjustment state.

The UE may use the active power control adjustment state for transmission power control.

One MAC CE for each SRI field value may activate one power control adjustment state. The UE may associate the active power control adjustment state to a corresponding SRI field value (power control configuration).

The UE may use the power control adjustment state that is associated with the received SRI field value out of a plurality of active power control adjustment states that are associated with a plurality of SRI field values for measurement of the pathloss.

For example, the power control configuration as shown in FIG. 1 may be configured for the UE, the power control adjustment state that is activated by using the MAC CE corresponding to SRI field value 0 may be used as power control adjustment state #0, and the power control adjustment state that is activated by using the MAC CE corresponding to SRI field value 1 may be used as power control adjustment state #1. When the UE receives the SRI field, the UE may use the power control adjustment state corresponding to the SRI field value out of power control adjustment states #0 and #1 for transmission power control.

Up to N power control adjustment states may be active at one time. One MAC CE may activate a plurality of power control adjustment states.

The N power control adjustment states may be respectively associated with N power control configurations. The k-th power control configuration corresponding to an SRI field value k (0≤k≤N−1) may be associated with the k-th power control adjustment state.

<<State Update Method 3>>

When the UE calculates or stores a plurality of power control adjustment states corresponding to a plurality of spatial relations for at least one of the PUSCH and the PUCCH and the spatial relations are updated by using the MAC CE, the UE may apply the power control adjustment states corresponding to the spatial relations to at least one of the PUSCH and the PUCCH. The spatial relation may be spatial relation of the SRS configured for the spatial relation of at least one of the PUSCH and the PUCCH, or may be spatial relation indicated by the SRI field. The SRS may be at least one of the A-SRS, the P-SRS, and the SP-SRS. The power control adjustment state may be at least one of the PUSCH power control adjustment state $f_{b,f,c}(i, 1)$ and the PUCCH power control adjustment state $g_{b,f,c}(i, 1)$. The spatial relation may be represented by at least one of an SRS (for example, A-SRS) resource ID, a spatial relation ID, and an SRI field value.

For example, as shown in FIG. 7, when four A-SRS resources are configured for the UE by using RRC signaling and the UE receive the MAC CE indicating activation of A-SRS resource ID #1, the UE may apply the power control adjustment state corresponding to A-SRS resource ID #1 to closed loop transmission power control (CL-TPC).

When at least one condition of state update conditions 1 to 4 described above is satisfied and the spatial relation is updated by using the MAC CE, the UE may apply the power control adjustment state corresponding to the spatial relation to at least one of the PUSCH and the PUCCH.

<<State Update Method 4>>

When the UE calculates or stores a plurality of power control adjustment states corresponding to a plurality of pathloss reference RSs for at least one of the PUSCH and the PUCCH, and the pathloss reference RSs are updated by using the MAC CE, the UE may apply the power control adjustment states corresponding to the pathloss reference RSs to at least one of the PUSCH and the PUCCH. The pathloss reference RS may be the pathloss reference RS that is configured for at least one of the PUSCH and the PUCCH. The power control adjustment state may be at least one of the PUSCH power control adjustment state $f_{b,f,c}(i, 1)$ and the PUCCH power control adjustment state $g_{b,f,c}(i, 1)$.

For example, as shown in FIG. 8, when four pathloss reference RSs are configured for the UE by using RRC signaling and the UE receives the MAC CE indicating activation of pathloss reference RS ID #1, the UE may apply the power control adjustment state corresponding to pathloss reference RS ID #1 to closed loop transmission power control (CL-TPC).

When at least one condition of state update conditions 1 to 4 described above is satisfied and the pathloss reference RS is updated by using the MAC CE, the UE may apply the power control adjustment state corresponding to the pathloss reference RS to at least one of the PUSCH and the PUCCH.

According to the present embodiment, the UE can determine an appropriate power control adjustment state based on the MAC CE, and can thus determine appropriate transmission power.

Fifth Embodiment

When the spatial relation of the SRS is updated by using the MAC CE, the SRI field length may be larger than the SRI field length (2 or 4) according to Rel. 15 NR. The SRS may be at least one of the A-SRS, the P-SRS, and the SP-SRS.

The SRI field length of a case where the spatial relation of the A-SRS is updated by using the MAC CE may be larger than the SRI field length of a case where the spatial relation of the A-SRS is not updated by using the MAC CE.

In Rel. 15 NR, one spatial relation is configured for one A-SRS resource. More than one spatial relations may be configured for one A-SRS resource, and one of the configured spatial relations may be activated by using the MAC CE.

The SRS spatial relation may be updated by using the MAC CE, and accordingly, the power control configuration may be indicated by the SRI field. The SRI field value may be associated with a combination of the SRS spatial relation and the power control configuration. For the UE, the power control configuration corresponding to the SRS spatial relation may be indicated by the SRI field value.

The SRI field length may be $\log_2$ {(number of SRS resources in SRS resource set having usage of codebook transmission or noncodebook transmission)×(number of spatial relations configured for one SRS resource)}.

When one spatial relation of the A-SRS is configured for the UE, the spatial relation of the A-SRS need not be updated by using the MAC CE. When more than one spatial relation of the A-SRS is configured for the UE, the spatial relation of the A-SRS may be updated by using the MAC CE.

FIG. 9A shows an example of association between the SRI field value (power control configuration ID) and the power control configuration when the SRS spatial relation is not updated by using the MAC CE. In the present example, the SRI field length has 1 bit, and the number of SRI field values is two.

FIG. 9B shows an example of association between the SRI field value (power control configuration ID) and the power control configuration when the SRS spatial relation is updated by using the MAC CE. In the present example, the SRI field length has 2 bits, and the number of SRI field values is four.

According to the present embodiment, when the SRS spatial relation is updated by using the MAC CE, the power control configuration can be updated according to the SRS spatial relation, and appropriate transmission power can thus be determined.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
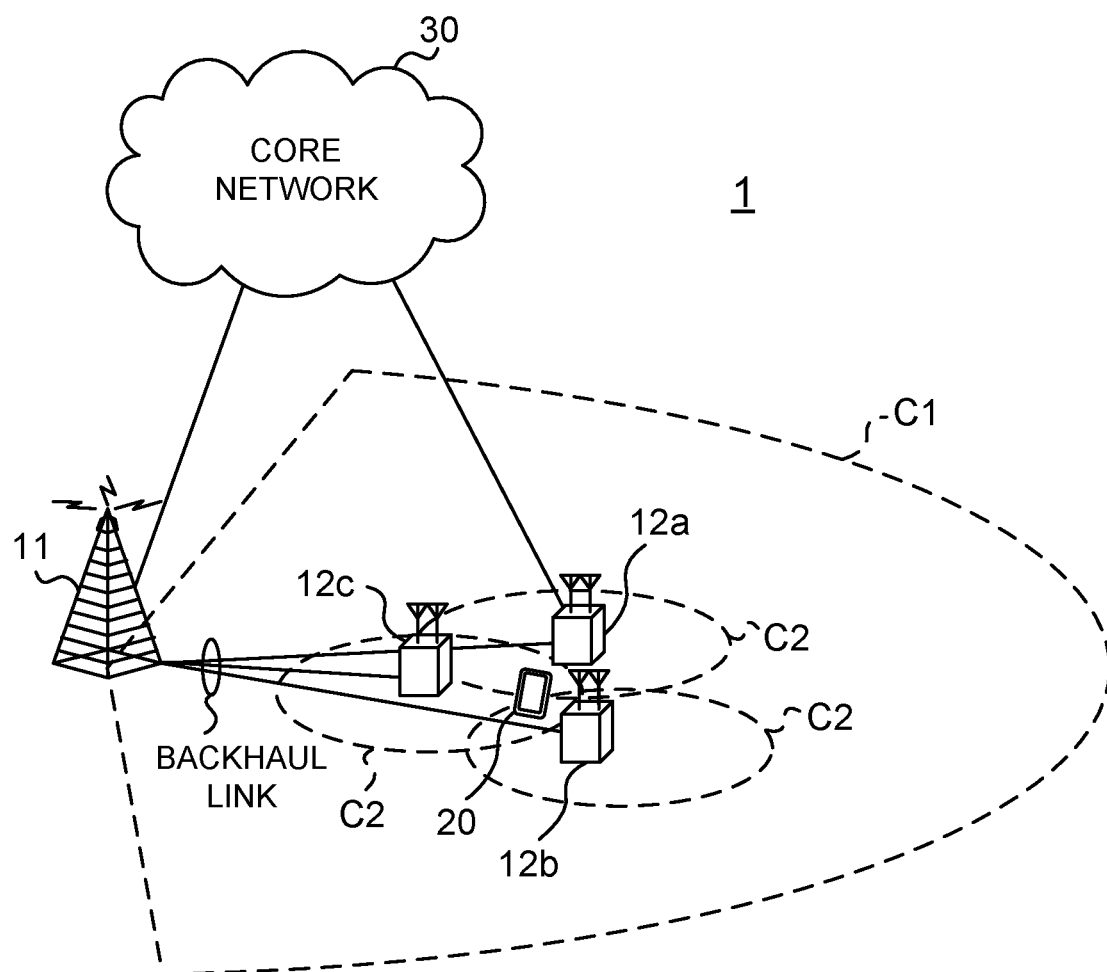
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
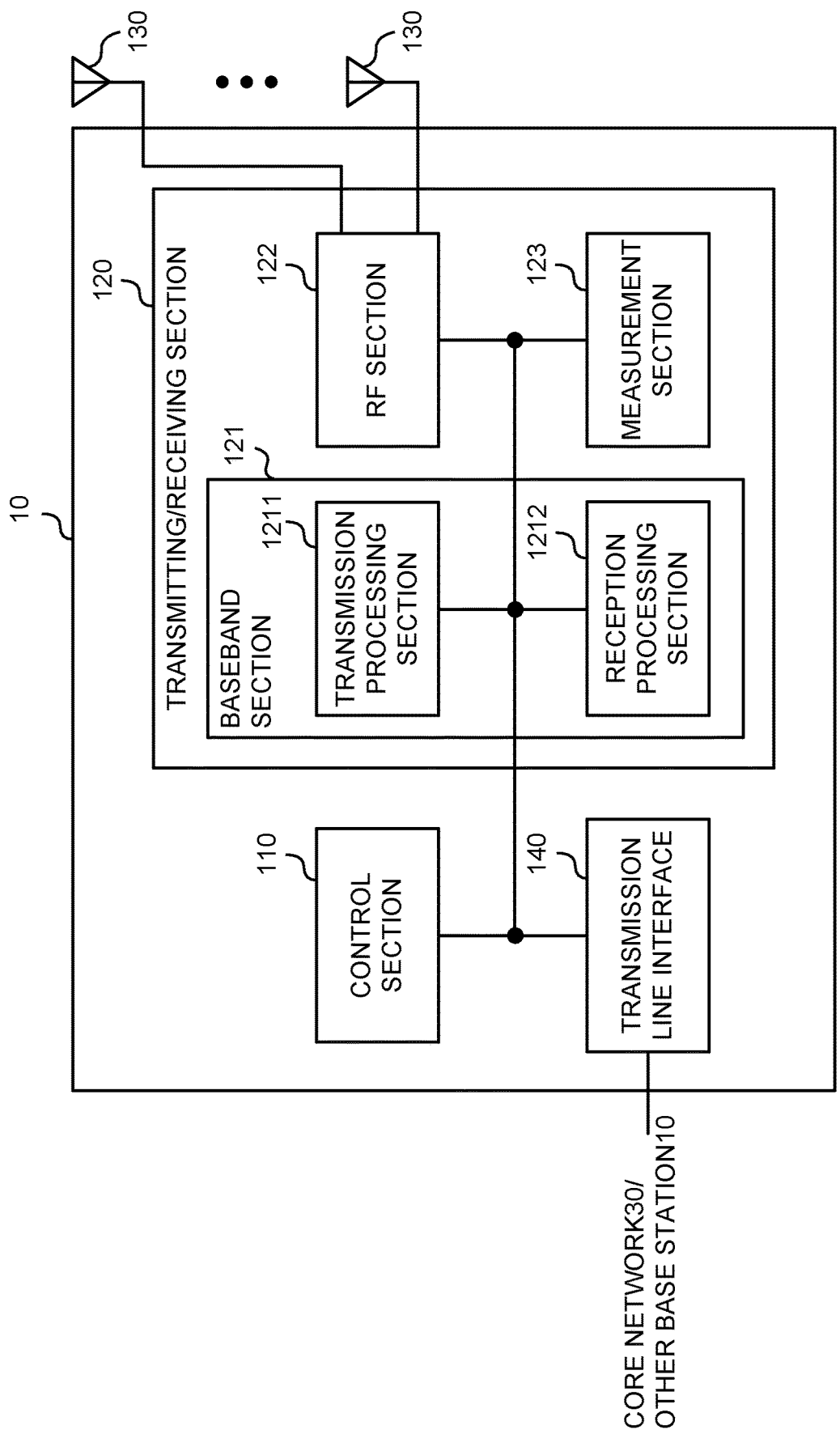
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a reference signal (for example, the SSB, the CSI-RS, or the like). The transmitting/receiving section 120 may transmit information (the MAC CE or the DCI) for indicating a TCI state for specific DL transmission. The TCI state may indicate at least one of a reference signal (for example, the SSB, the CSI-RS, or the like), a QCL type, and a cell in which the reference signal is transmitted. The TCI state may indicate one or more reference signals. The one or more reference signals may include a reference signal of QCL type A, or may include a reference signal of QCL type D.

The control section 110 may assume that a first reference signal of spatial relation of specific uplink transmission (for example, the SRS, the PUCCH, the PUSCH, or the like) is a second reference signal (for example, the SSB or the CSI-RS) of QCL type D in a transmission control indication (TCI) state or quasi-co-location (QCL) assumption of a specific downlink channel (for example, the PDCCH, the PDSCH, or the like).

(User Terminal)

Figure 12:
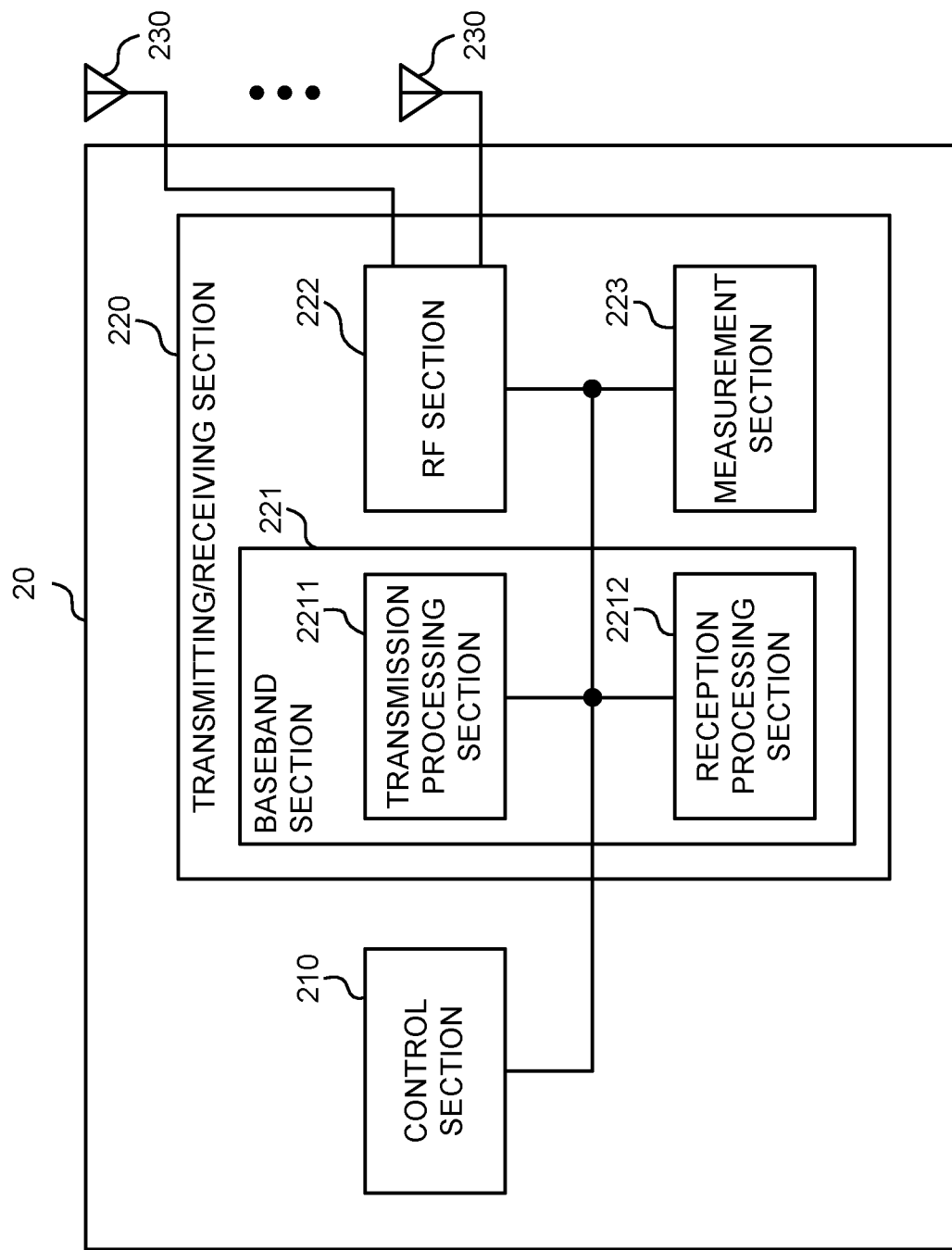
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine a reference signal for pathloss reference (for example, the pathloss reference RS) for a physical uplink shared channel (PUSCH), based on any one of reception of a medium access control control element (MAC CE, activation MAC CE, activation/deactivation MAC CE) and transmission of a random access channel (PRACH, random access preamble). The transmitting/receiving section 220 may transmit the PUSCH by using transmission power based on the reference signal for pathloss reference.

The control section 210 may determine a reference signal for pathloss reference (for example, the pathloss reference RS) for a physical control shared channel (PUCCH), based on any one of reception of a medium access control control element (MAC CE, activation MAC CE, activation/deactivation MAC CE) and transmission of a random access channel (PRACH, random access preamble). The transmitting/receiving section 220 may transmit the PUCCH by using transmission power based on the reference signal for pathloss reference.

The MAC CE may indicate at least one of a plurality of the reference signals for pathloss reference.

The MAC CE may indicate spatial relation (the spatial relation information, the SRS resource, or the like) for sounding reference signal (SRS), and the control section 210 may determine a downlink reference signal of the spatial relation as the reference signal for pathloss reference.

The MAC CE may indicate a transmission configuration indication (TCI) state, and the control section 210 may determine a downlink reference signal of the TCI state as the reference signal for pathloss reference.

When quasi-co-location (QCL) assumption of a physical downlink control channel (PDCCH) is updated by using the random access channel, the control section 210 may determine a synchronization signal block associated with a transmission occasion of the random access channel as the reference signal for pathloss reference.

The control section 210 may determine a power control parameter for a physical uplink shared channel (PUSCH), based on reception of a medium access control control element (MAC CE). The transmitting/receiving section 220 may transmit the PUSCH by using transmission power based on the power control parameter.

The control section 210 may determine a power control parameter for a physical uplink control channel (PUCCH), based on reception of a medium access control control element (MAC CE). The transmitting/receiving section 220 may transmit the PUCCH by using transmission power based on the power control parameter.

The power control parameter may be used for open loop power control, and the MAC CE may indicate at least one of a plurality of the power control parameters.

The power control parameter may be a power control adjustment state.

The MAC CE may indicate spatial relation (the spatial relation information, the SRS resource, or the like), and the control section 210 may set the power control adjustment state to a default value.

The MAC CE may indicate a parameter of at least one of an index, spatial relation, a sounding reference signal (SRS) resource, and a reference signal for pathloss reference, and the control section 210 may determine the power control adjustment state associated with the parameter.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
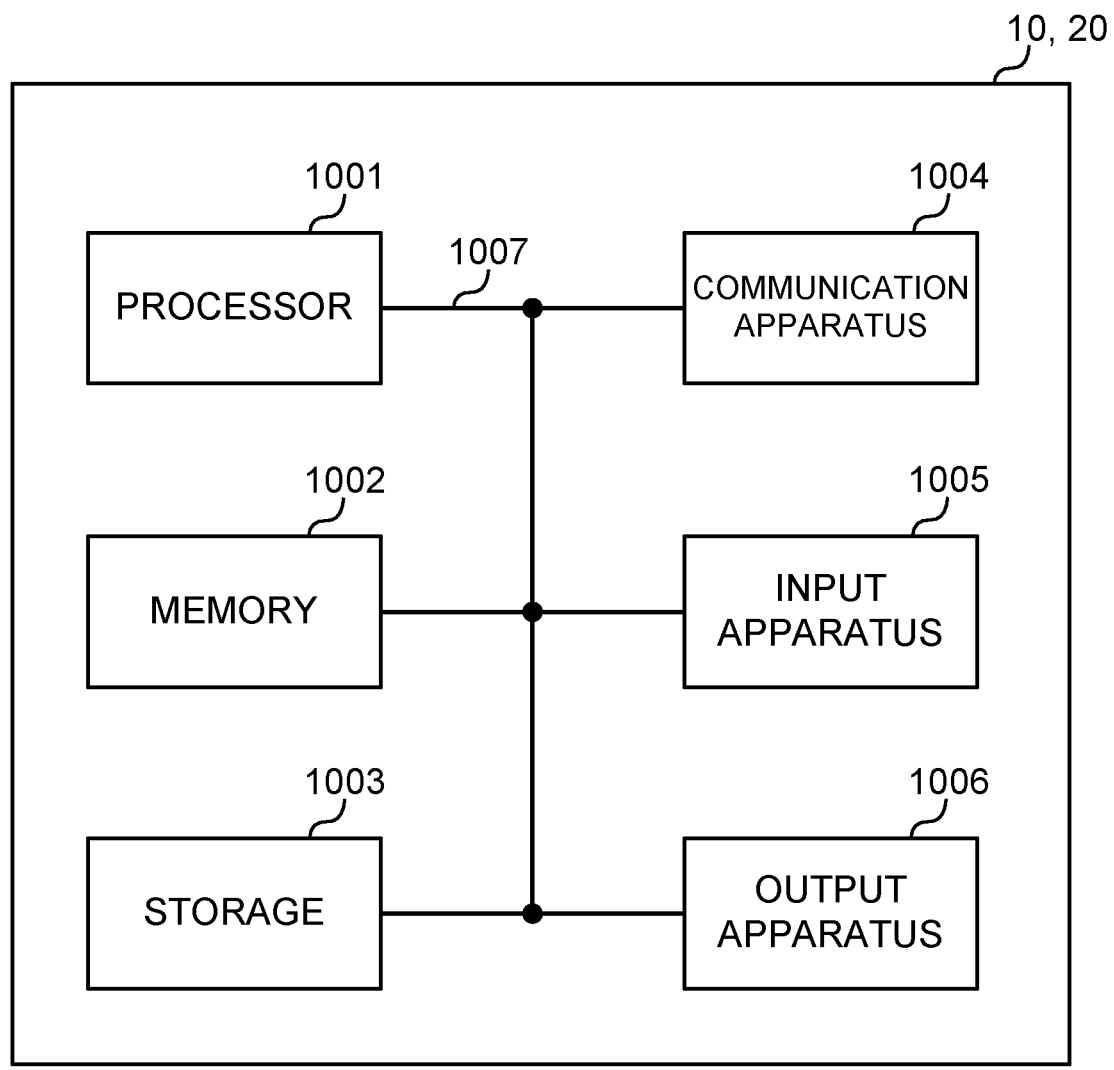
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives a configuration of a physical uplink shared channel (PUSCH), receives a medium access control-control element (MAC CE), and receives downlink control information scheduling the PUSCH; and
   a controller that controls transmission of the PUSCH,
   wherein when the configuration includes a list including values of a sounding reference signal resource indicator (SRI) field and IDs of reference signals for pathloss reference for the PUSCH, when the IDs correspond to the values respectively, when the MAC CE indicates a specific ID of a reference signal for pathloss reference corresponding to a specific value among the values, and when the downlink control information includes an SRI field indicating the specific value, the controller uses, for pathloss estimation of the PUSCH, the reference signal corresponding to the specific ID, and
   when the reference signals are not configured, and when the MAC CE indicates a transmission configuration indication (TCI) state for a physical downlink control channel (PDCCH), the controller uses, for pathloss estimation of the PUSCH, a downlink reference signal in the TCI state with a quasi co-location type of a spatial reception parameter.

2. A radio communication method for a terminal, comprising:
   receiving a configuration of a physical uplink shared channel (PUSCH);
   receiving a medium access control-control element (MAC CE);
   receiving downlink control information scheduling the PUSCH; and
   controlling reception of the PUSCH,
   wherein when the configuration includes a list including values of a sounding reference signal resource indicator (SRI) field and IDs of reference signals for pathloss reference for the PUSCH, when the IDs correspond to the values respectively, when the MAC CE indicates a specific ID of a reference signal for pathloss reference corresponding to a specific value among the values, and when the downlink control information includes an SRI field indicating the specific value, the terminal uses, for pathloss estimation of the PUSCH, the reference signal corresponding to the specific ID, and
   when the reference signals are not configured, and when the MAC CE indicates a transmission configuration indication (TCI) state for a physical downlink control channel (PDCCH), the terminal uses, for pathloss estimation of the PUSCH, a downlink reference signal in the TCI state with a quasi co-location type of a spatial reception parameter.

3. A base station comprising:
   a transmitter that transmits a configuration of a physical uplink shared channel (PUSCH), transmits a medium access control-control element (MAC CE), and transmits downlink control information scheduling the PUSCH; and
   a controller that controls reception of the PUSCH,
   wherein when the configuration includes a list including values of a sounding reference signal resource indicator (SRI) field and IDs of reference signals for pathloss reference for the PUSCH, when the IDs correspond to the values respectively, when the MAC CE indicates a specific ID of a reference signal for pathloss reference corresponding to a specific value among the values, and when the downlink control information includes an SRI field indicating the specific value, the reference signal corresponding to the specific ID is used for pathloss estimation of the PUSCH, and
   when the reference signals are not configured, and when the MAC CE indicates a transmission configuration indication (TCI) state for a physical downlink control channel (PDCCH), a downlink reference signal in the TCI state with a quasi co-location type of a spatial reception parameter is used for pathloss estimation of the PUSCH.

4. A system comprising a terminal and a base station, wherein
   the terminal comprises:
      a receiver that receives a configuration of a physical uplink shared channel (PUSCH), receives a medium access control-control element (MAC CE), and receives downlink control information scheduling the PUSCH; and
      a controller that controls transmission of the PUSCH, and
   the base station transmits the configuration, transmits the MAC CE, and transmits the downlink control information,
   when the configuration includes a list including values of a sounding reference signal resource indicator (SRI) field and IDs of reference signals for pathloss reference for the PUSCH, when the IDs correspond to the values respectively, when the MAC CE indicates a specific ID of a reference signal for pathloss reference corresponding to a specific value among the values, and when the downlink control information includes an SRI field indicating the specific value the specific value, the controller uses, for pathloss estimation of the PUSCH, the reference signal corresponding to the specific ID, and
   when the reference signals are not configured, and when the MAC CE indicates a transmission configuration indication (TCI) state for a physical downlink control channel (PDCCH), the controller uses, for pathloss estimation of the PUSCH, a downlink reference signal in the TCI state with a quasi co-location type of a spatial reception parameter.

\* \* \* \* \*